United States Patent
Boblitt et al.

(10) Patent No.: US 12,326,829 B1
(45) Date of Patent: Jun. 10, 2025

(54) MODULAR UNIFIED AVIONICS SYSTEM

(71) Applicant: United States of America as Represented by the Administrator of NASA, Washington, DC (US)

(72) Inventors: Zachary Boblitt, Nashville, TN (US); Noosha Haghani, Fulton, MD (US); Robert Gheen, Accokeek, MD (US); Amri Hernandez-Pellerano, Clarksville, MD (US); Austin Lanham, Baltimore, MD (US); Bradford Kercheval, Greenbelt, MD (US); Michael Burns, Greenbelt, MD (US); James Fraction, Greenbelt, MD (US); Omar Haddad, South Daytona, FL (US); Shahana Pagen, Lanham, MD (US); Erik Laurila, Herndon, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 301 days.

(21) Appl. No.: 17/883,226

(22) Filed: Aug. 8, 2022

(51) Int. Cl.
  *G06F 13/42* (2006.01)
  *B64G 1/22* (2006.01)

(52) U.S. Cl.
  CPC ........... *G06F 13/4282* (2013.01); *B64G 1/22* (2013.01); *G06F 2213/0016* (2013.01)

(58) Field of Classification Search
  None
  See application file for complete search history.

(56) References Cited

U.S. PATENT DOCUMENTS

| | | | | |
|---|---|---|---|---|
| 10,645,845 | B2 * | 5/2020 | Christiansen | H05K 7/026 |
| 2003/0223209 | A1 * | 12/2003 | Lee | H05K 7/1425 |
| | | | | 361/796 |
| 2004/0252467 | A1 * | 12/2004 | Dobbs | G06F 1/16 |
| | | | | 361/752 |
| 2011/0228474 | A1 * | 9/2011 | Leibowitz | H05K 7/1461 |
| | | | | 361/752 |
| 2012/0065813 | A1 * | 3/2012 | Nguyen | H04B 7/18519 |
| | | | | 701/2 |
| 2014/0042883 | A1 * | 2/2014 | Lin | H05K 7/1487 |
| | | | | 312/223.1 |
| 2015/0363981 | A1 * | 12/2015 | Ziarno | H04L 67/12 |
| | | | | 701/1 |
| 2022/0095475 | A1 * | 3/2022 | Gustavsson | H05K 7/20736 |

OTHER PUBLICATIONS

Computer Standardization (Year: 2020).*

* cited by examiner

*Primary Examiner* — Henry Tsai
*Assistant Examiner* — Dean Phan
(74) *Attorney, Agent, or Firm* — Christopher O. Edwards; Matthew F. Johnston; Trenton J. Roche

(57) ABSTRACT

An avionics system includes a plurality of card assemblies having a standard height and width, and a depth dependent on dimensions of components mounted on individual ones of the plurality of card assemblies, and a subset of the plurality of card assemblies selected according to their functionality and assembled together along their depth dimensions to form one or more modules having the standard height and width, wherein the one or more modules are distributable among available volumes within a spacecraft.

17 Claims, 16 Drawing Sheets

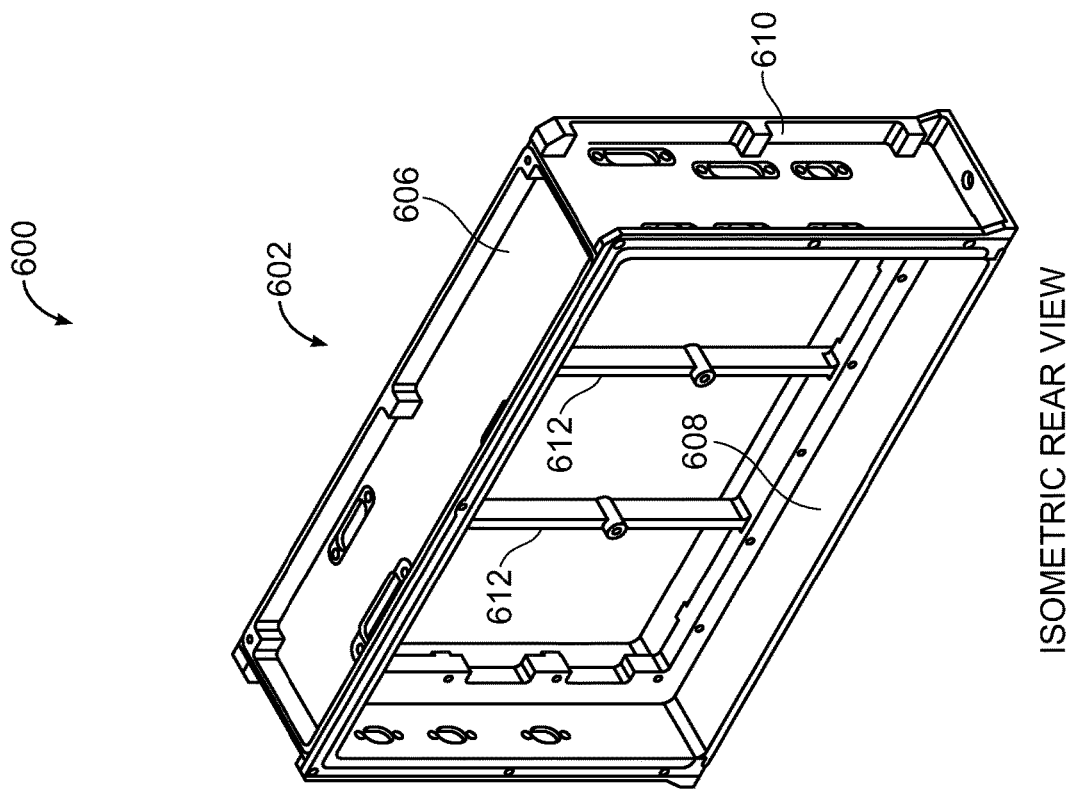
FIG. 6B ISOMETRIC REAR VIEW
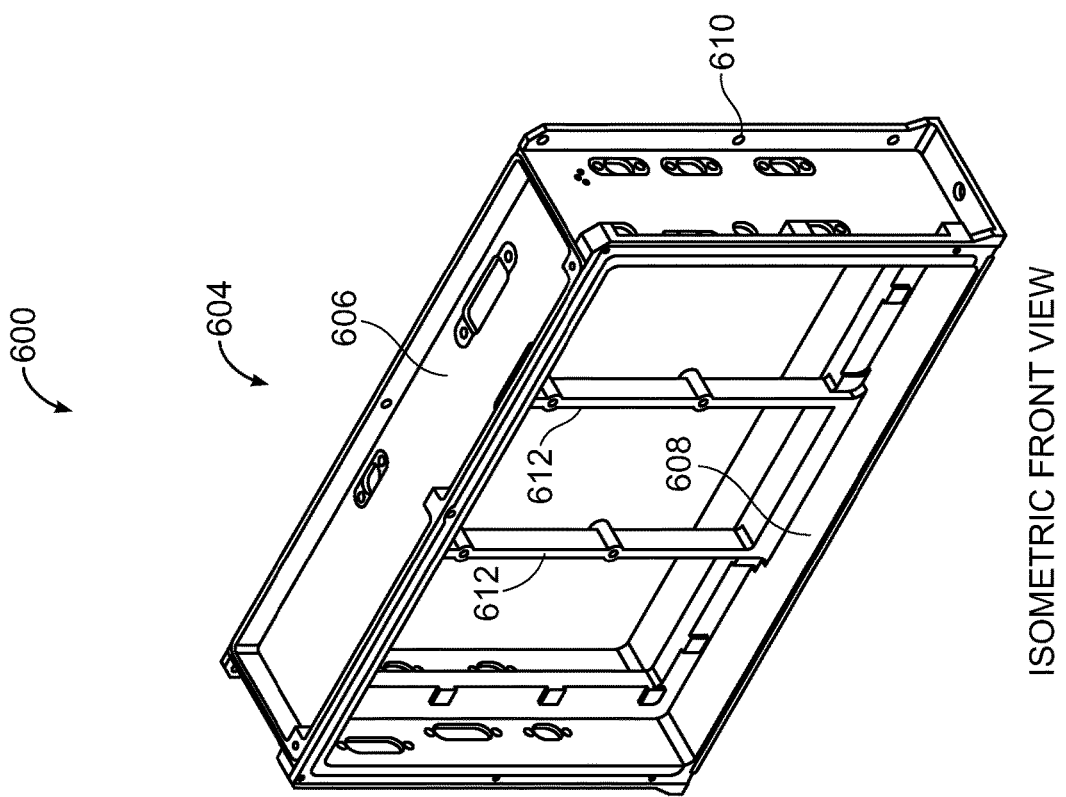
FIG. 6A ISOMETRIC FRONT VIEW

MODULAR UNIFIED AVIONICS SYSTEM

ORIGIN OF THE INVENTION

Invention by Government Employee(s) Only

The invention described herein was made by one or more employees of the United States Government, and may be manufactured and used by or for the Government for governmental purposes without the payment of any royalties thereon or therefor.

FIELD

The present disclosure is directed to a modular computing system, in particular to a modular avionics system for use across a wide range of applications.

BACKGROUND

Missions require specialized avionics systems often designed specifically for a particular mission.

There is an unmet need for a standard set of off the shelf avionics functions that may be assembled to meet the needs of multiple missions reducing recurring design and qualification costs.

SUMMARY

In at least one aspect, the disclosed embodiments are directed to a modular set of off the shelf avionics functions that provides a capability to select a set of assemblies that perform different functions as needed and connect them together in a configuration that conforms to available volumes within a spacecraft. A minimum set of assemblies may include a communication card, a processor card, and a power monitor card. Additional assemblies may include a house keeping card, an engine valve drive card, and a data storage card. Some embodiments of the avionics system may also include a low voltage power controller card, an output module card, and a solar array control card. While the disclosed embodiments are described in the context of a spacecraft avionics system, it should be understood that the disclosed embodiments are applicable to any avionics system.

the disclosed embodiments are directed to an avionics system including a plurality of card assemblies having a standard height and width, and a depth dependent on dimensions of components mounted on individual ones of the plurality of card assemblies and, a subset of the plurality of card assemblies selected according to their functionality and assembled together along their depth dimensions to form one or more modules having the standard height and width, for providing selected avionics functions for a spacecraft.

The one or more modules may be distributable among available volumes within the spacecraft.

The one or more modules may be distributable to meet one or more power, weight, volume, data transfer, or thermal requirements.

The one or more modules may include endcaps attached to each end of a depth dimension of the one or more modules.

The avionics system may include a lid assembly attached to an end of at least one of the modules and extending along a width and depth of the module.

The lid assembly may include an enclosure extending around a perimeter of the at least one module and a lid attached to the enclosure.

Each card assembly may include a card mounted in a chassis.

The chassis may include a mechanism for fastening the chassis to an adjacent chassis.

The chassis may include a heatsink configured to conduct heat from the card assembly through a base of the chassis.

The chassis may include bracing to accommodate structural loads of the card.

The chassis may include a lip extending around a perimeter of a first end and a groove extending around a perimeter of a second end, wherein when two or more chassis are mated together the lip of a first chassis extends into a groove of a second chassis and provides enhanced EMI shielding.

The plurality of card assemblies may include one or more of a communication card, a processor card, a power monitor card, a house keeping card, an engine valve drive card, a data storage card, a low voltage power controller card, an output module card, and a solar array control card.

The communication card may be configured to provide housekeeping data received from the processor card to an S-Band transponder of a communications subsystem coupled to the communication card, utilizing a first field programmable gate array.

The first field programmable gate array may include a SpaceWire Router IP Core configured to control SpaceWire data flow among the plurality of card assemblies, an S-Band IP Core for controlling data flow to the S-Band transponder, and a High Speed IP Core for controlling dataflow to an X and Ka Band transponder of the communication subsystem coupled to the communication card.

The processor card may be configured to store and run flight software and control operations of the avionics system utilizing a main CPU and a second field programmable gate array.

The main CPU may be configured to control a data bus among the plurality of card assemblies and process application code for the avionics system, and the second field programmable gate array may be configured to provide an additional CPU for the processor card, route SpaceWire ports on the processor card, control memory devices on the processor card, and implement an Ethernet port on the processor card.

The processor card may further include a programmable read only memory storing boot code for the processor card, a magnetoresistive random access memory storing application code for the processor card, a static random access memory providing temporary volatile storage and running space for the application code, and a flash memory providing non-volatile storage and configured to be power cycled to clear single event functional interrupt events.

The power monitor card may be configured to control power converters and switches on the low voltage power controller card, read telemetry information from the low voltage power controller card and the output module card, and provide recovery signals for cards requiring a reset to resume normal operations, under control of a power monitor field programmable gate array.

The power monitor card may include a power monitor clock for providing timing signals to the power monitor field programmable gate array, on-board magnetoresistive random access memory for storing initial states, configuration, and command data, an amplifier coupled to an A/D converter for converting the telemetry information, a low voltage power controller card inhibit circuit for controlling the power converters and switches on the low voltage power controller card, and dual I2C bus interfaces for retrieving the telemetry information from the low voltage power controller card and the output module card.

The housekeeping card may be configured to monitor thermal telemetry and single ended and differential voltages from the communication card, processor card, power monitor card, engine valve drive card, data storage card, low voltage power controller card, output module card, and solar array control card, under control of a housekeeping field programmable gate array.

BRIEF DESCRIPTION OF THE DRAWINGS

FIGS. 6A and 6B depict a front and rear view of an exemplary chassis with an extended depth and bracing;

DETAILED DESCRIPTION

Figure 1:
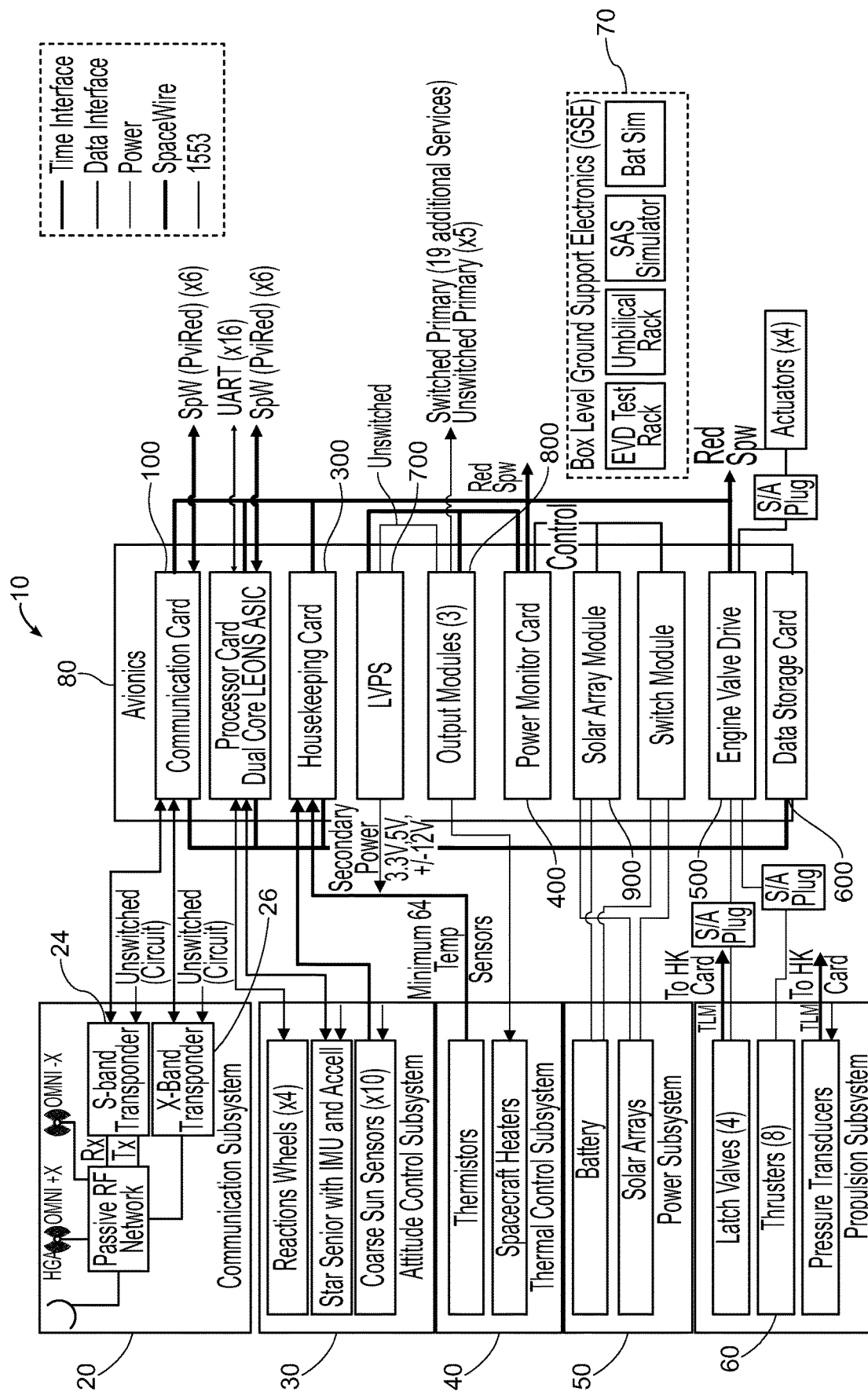
FIG. 1 shows a functional block diagram of an exemplary system according to the disclosed embodiments.

FIG. 1 illustrates a satellite system 10 according to the disclosed embodiments. The satellite system 10 may include a communications subsystem 20, an attitude control subsystem 30, a thermal control system 40, a power subsystem 50, a propulsion subsystem 60, ground support electronics 70, and an exemplary modular unified avionics system 80.

The modular unified avionics system 80 may operate as a Command and Data Handling (C&DH) subsystem and may include a communication card 100, a processor card 200, a house keeping card 300, a power monitor card 400, an engine valve drive card 500, and a data storage card 600. Some embodiments of the avionics system 80 may also include a low voltage power controller card 700, an output module card 800 and a solar array control card 900.

The modular unified avionics system 80 may be a completely redundant system with each card cross strapped to an identical backup card.

Each of the cards 100, 200, 300, 400, 500, 600, 700, 800, 900 may be equipped with primary and redundant Space-Wire Remote Memory Access Protocol (RMAP) compliant nodes for communication among the modular unified avionics system components. The cards may also conform to a standard size configuration.

It should be understood that the term SpaceWire, as referred to throughout this application, may refer to a computer network suitable for connecting instruments, mass-memory, processors, downlink telemetry, and other spacecraft sub-systems with approximately 2 to 200 Mbit/s, bi-directional, full-duplex, point to point data links and routing switches.

The Remote Memory Access Protocol (RMAP) refers to a protocol that allows a SpaceWire node to write to and read from memory inside another SpaceWire node to provide a low-level mechanism for the transfer of data between two SpaceWire nodes. Read and write operations defined in the RMAP protocol are posted without waiting for an acknowledgement or reply to be received.

Low Voltage Differential Signaling (LVDS) refers to a low power general purpose twisted pair interface that typically operates at greater than 155.5 Mbps. It should also be understood that RS-422 and LVDS interfaces may be used interchangeably throughout this application.

Inter-Integrated circuit (I2C) refers to a two wire, synchronous, multicontroller, multi-peripheral device communication bus.

Serial Peripheral Interface (SPI) refers to a four wire, synchronous, full duplex communication bus, typically with one controller and multiple slave devices.

For purposes of the disclosed embodiments, the term "card assembly" refers to an assembly of electronic components or a combination of electronic and electromechanical components that perform one or more functions mounted in a chassis as described below.

While each of the cards 100, 200, 300, 400, 500, 600, 700, 800, 900 of the modular unified avionics system 80 are described individually and in the context of the avionics system 80 having a single one of each card, it should be understood that the avionics system 80 may be implemented with any number of the individual cards suitable for a particular mission.

System Modularity

Each of the cards 100, 200, 300, 400, 500, 600, 700, 800, 900 of the modular unified avionics system 80 may have a form factor that allows cards to be selected as required and assembled in any order that may be advantageous. Each card may be mounted in a chassis to form a card assembly with a standard height and width, and a depth that may be dependent on dimensions of components mounted to a particular card. In some embodiments, the depth of the chassis may be selected from a preselected set of depths according to the dimensions of components mounted to the particular card. The card assemblies may be selected according to their functionality and assembled together along their depth dimension to form a module. In some embodiments, the card assemblies may be configured into a set of card assemblies connected together in a configuration where the modules are distributed among available volumes within a spacecraft. The modules may also be distributed to meet different power, weight, volume, data transfer, thermal, or any individual or combination of requirements.

Figure 2:
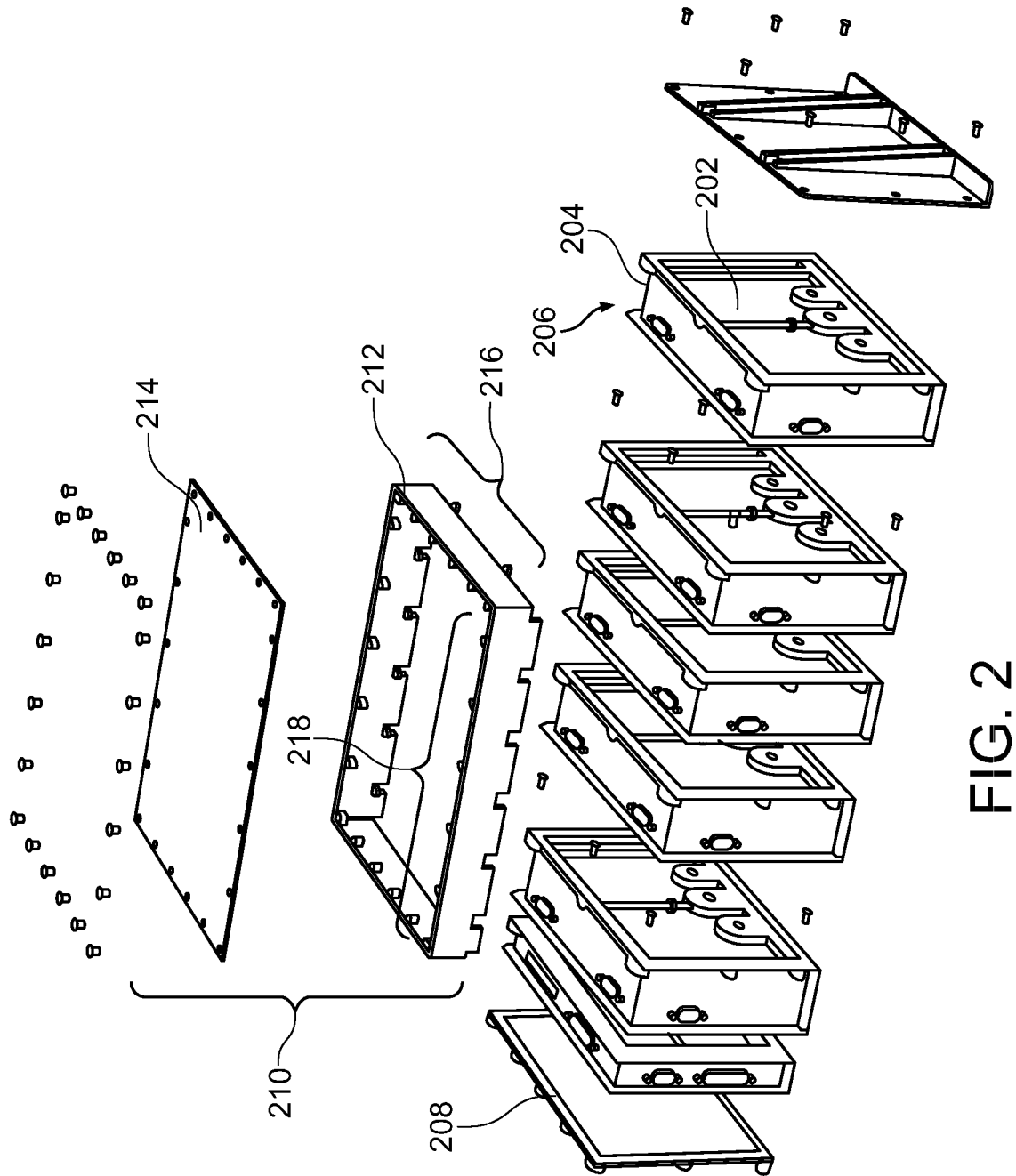
FIG. 2 depicts an exploded mechanical diagram of an exemplary module of card assemblies.

FIG. 2 depicts an exploded mechanical diagram of an exemplary module 200 having a selected set of cards 202, each mounted in a chassis 204 to form a card assembly 206. The card assemblies 206 may be fastened together along their depth dimensions. Endcaps 208 may be attached to a card assembly 206 at each end of the module 200 to provide structural stiffness, electromagnetic interference shielding, and physical protection for the cards housed in the module 200. An optional Faraday lid assembly 210 may be included having an enclosure 212 and a cover 214. The Faraday lid assembly may be attached to an end of the module 200 and may extend along a width 216 and depth 218 dimension of the module 200. The card assemblies 206 may be electrically connected using harnesses within the enclosure 212, as explained below.

Figure 3:
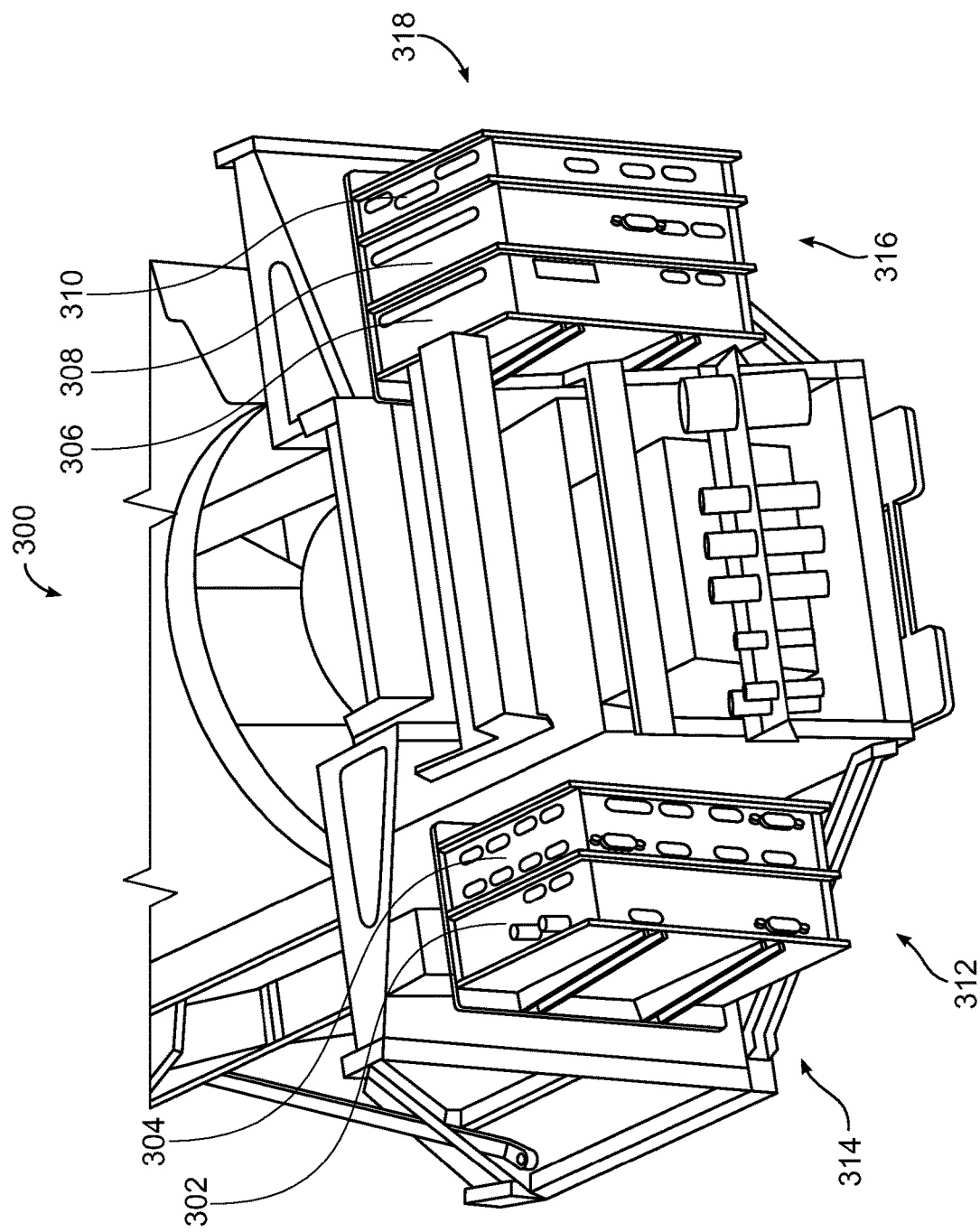
FIG. 3 illustrates an example of a set of card assemblies configured as a disaggregated distributed set of modules.

FIG. 3 illustrates an example of a set of card assemblies 302-310 configured as a disaggregated distributed set of modules 312, 314. In this example, card assemblies 302, 304 may be grouped together as a module 312 in one location 314, for example, to satisfy power dissipation and thermal requirements, while card assemblies 306-310 may be grouped together as another module 316 in another location 318, for example, to accommodate data transfer rates required among the cards. The card assemblies 302-310 may be distributed in any configuration in any number of modules to meet any type of mission requirements.

Figure 4:
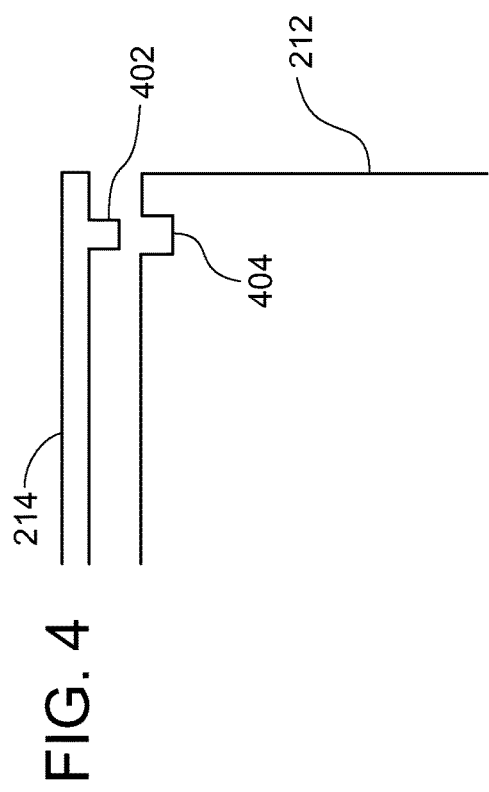
FIG. 4 illustrates a schematic cross sectional view of a cover and an enclosure.

The cover 214 and enclosure of the Faraday lid assembly 210 may be configured to reduce EMI emissions from the modules 200 and to attenuate EMI emissions into the modules 200 from other systems. FIG. 4 illustrates a schematic cross sectional view of the cover 214 and the enclosure 212 where a lip 402 extends around a perimeter of the cover 214 and a corresponding groove 404 extends around a perimeter of the enclosure 212. When the cover 214 and enclosure 212 are assembled together the lip 402 extends into the groove 404 and provides enhanced EMI shielding.

Figure 5B:
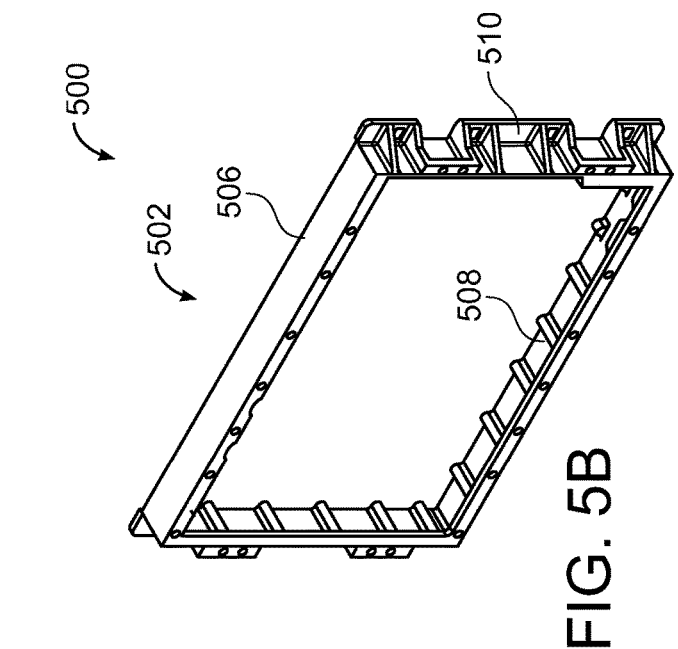
FIGS. 5A and 5B depict a front view and rear view of an exemplary chassis.
Figure 5A:
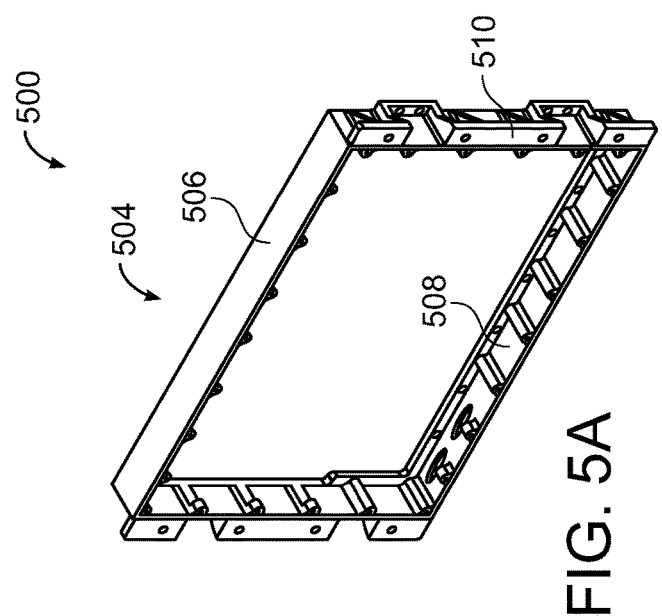

FIGS. 5A and 5B depict a front view 502 and rear view 504 of an exemplary chassis 500. The chassis 500 includes a top 506, a base 508, and a mechanism 510 for fastening the chassis 500 to an adjacent chassis, for example, a flange with openings to accommodate fasteners. The chassis 500 may be configured as, or may include a heatsink and is configured to conduct heat from a card through the base 508 to mounting points on which a module including the chassis 500 is mounted. As a result, each card assembly is provided with an individual passive thermal management system for conducting heat from the card to mounting points for its associated module.

FIGS. 6A and 6B depict a front 602 and rear 604 view of an exemplary chassis 600 with an extended depth and bracing to accommodate components that may require these features, for example, structural loads of a card. The chassis with extended depth and bracing 600 includes a top 606, a base 608, and a mechanism 610 for fastening the chassis 600 to an adjacent chassis. The chassis 600 may have a depth selected from a set of standard depths or may have a depth selected for a particular card with specific components. The bracing may include one or more ribs 612 provided to accommodate structural loads of a card, or a card with components with additional structural loads that may require increased stiffness, for example, for survival in high vibration applications. The one or more ribs 612 may be integral to the chassis 600 and fastened to a single side of a card or may be provided on and fastened to both sides of a card as required. The ribs 612 may also provide heatsinking and may be configured to conduct heat from a card through the base 608 to mounting points on which a module including the chassis 600 is mounted. This may provide each card assembly with extended depth and bracing with enhanced vibration survivability and a passive thermal management system for conducting heat from the card to points on which the associated module is mounted.

Figure 7:
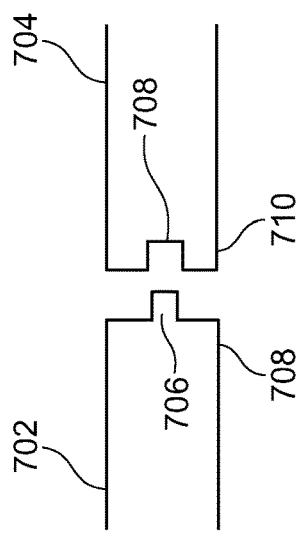
FIG. 7 illustrates a schematic cross sectional view of a pair of chassis along their depth dimensions.

The chassis may also include features configured to reduce EMI emissions from the modules 200 and to attenuate EMI emissions into the modules 200 from other systems. FIG. 7 illustrates a schematic cross sectional view of a pair of chassis 702, 704 along their depth dimensions. Each chassis may have a lip 706 extending around a perimeter of a first end 708 and a groove 708 extending around a perimeter of a second end 708, such that when two or more chassis are mated together the lip 702 of one chassis 702 extends into the groove 708 of another chassis 704 and provides enhanced EMI shielding.

Figure 8B:
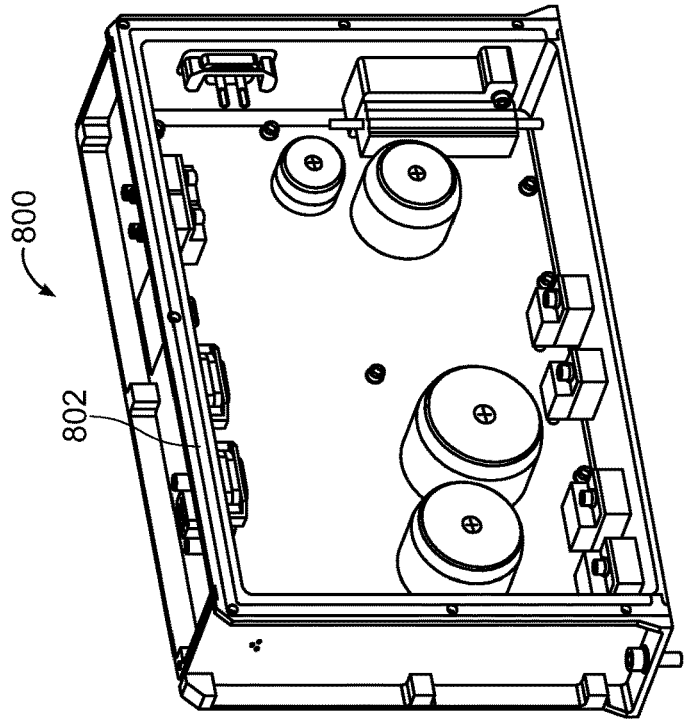
FIGS. 8A and 8B depict a card assembly with a chassis with additional heat sinking.
Figure 8A:
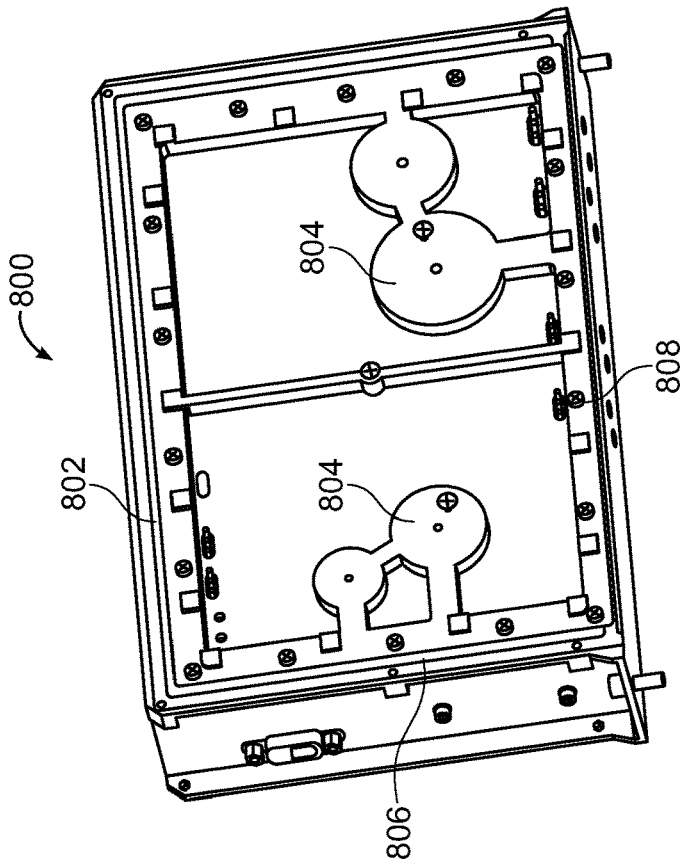

FIGS. 8A and 8B depict a card assembly 800 with a chassis 802 with additional heat sinking. For card mounted components that generate an amount of heat that requires specifically configured heat sinking, a chassis may be constructed with thermal conducting components 804 designed to conduct heat from the card mounted components to a perimeter 806 and a base 808 of the chassis 802.

Figure 9:
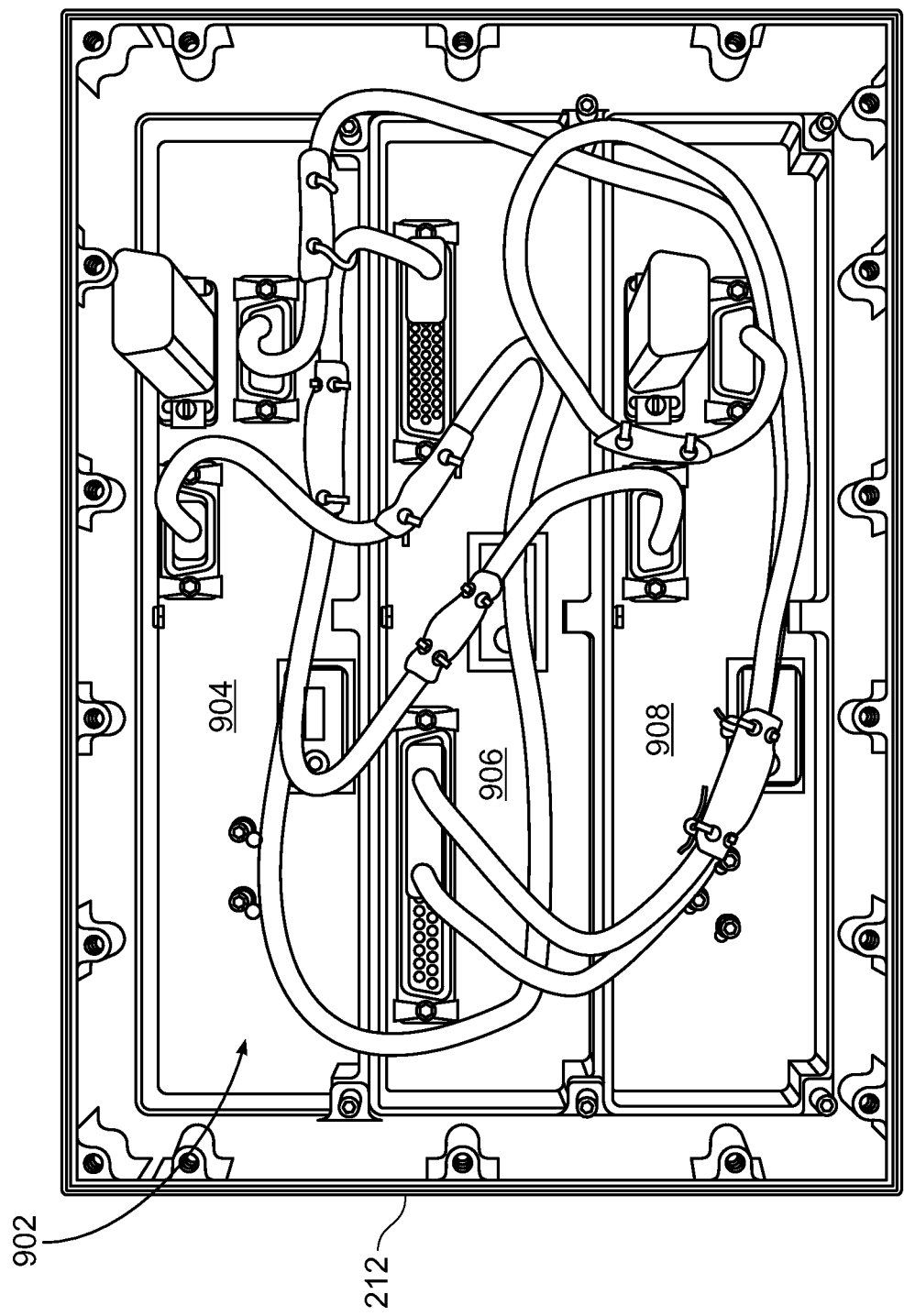
FIG. 9 depicts an exemplary harness assembly for a module.

FIG. 9 depicts an exemplary harness assembly 902 for a module. Various harness assemblies may be provided inside the Faraday lid enclosure 212 to interconnect card assemblies 904, 906, 908 within a module. Use of a harness assembly 902 advantageously allows card assemblies to be selected from any one or more of the communication card 100, processor card 200, house keeping card 300, power monitor card 400, engine valve drive card 500, data storage card 600, low voltage power controller card 700, output module card 800, and solar array control card 900, and configured in any combination over a distributed set of modules, for example, grouped together as a module in one location of a spacecraft coupled to another module in another location of a spacecraft without having to design custom motherboards for each distributed module.

Card Assemblies

Communication Card

As shown in FIG. 1, the communication card 100 is generally coupled to the processor card 200, power monitor card 400, data storage card 600, and communication subsystem 20. The communication card 100 serves primarily as an interface between the processor card and the communication subsystem 20 to support uplink and downlink functions over S-Band and high speed downlink functions over X-band and Ka-band and supports the transmission and reception of data simultaneously over S-band, X-band and Ka-band. While the communication card 100 is described as a single card, it should be understood that there may be redundant, cross strapped communication cards in the modular unified avionics system 80.

Figure 10:
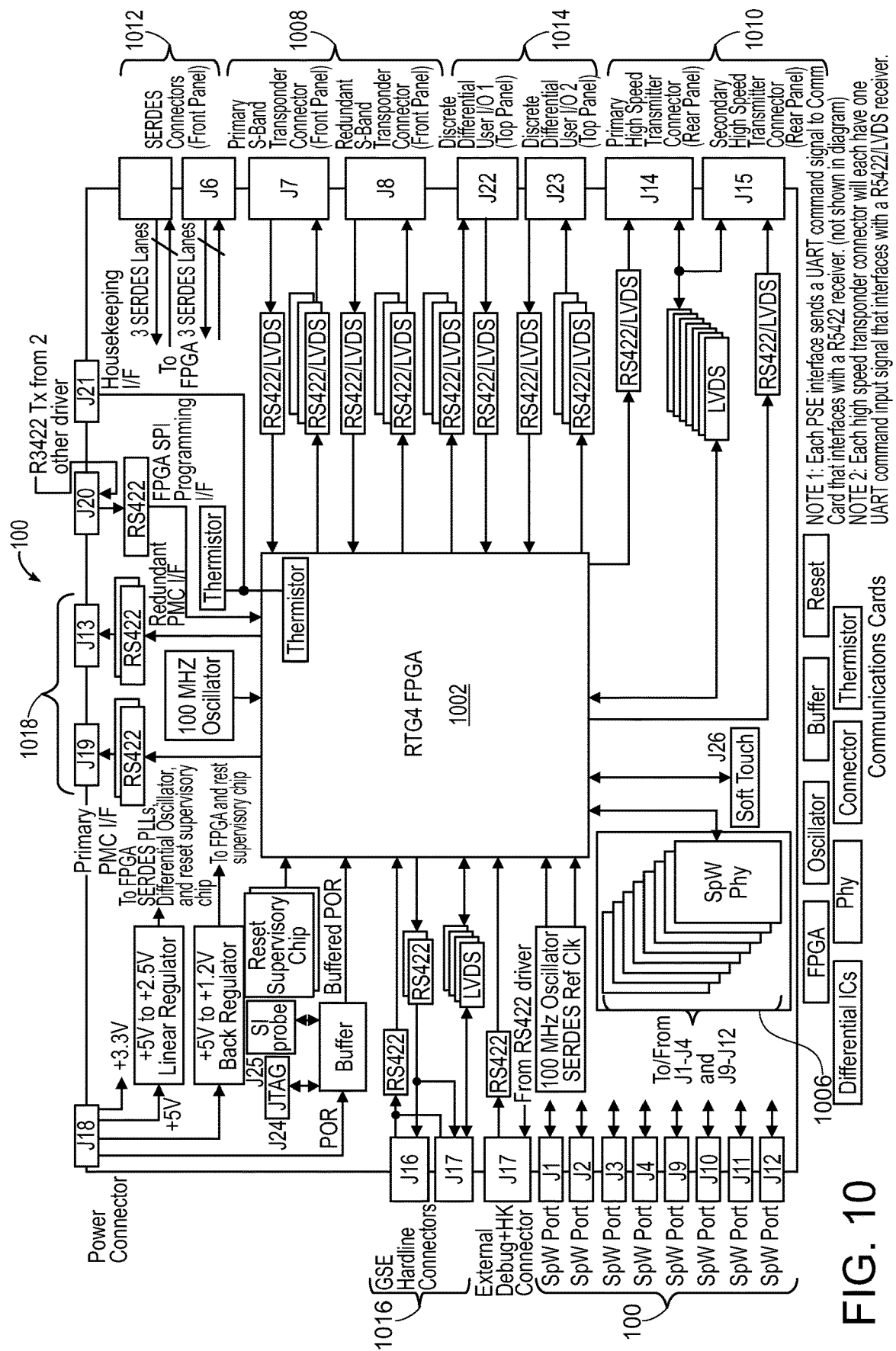
FIG. 10 depicts a block diagram of a communication card.

FIG. 10 depicts a block diagram of the communication card 100. The communication card 100 may include a Field Programmable Gate Array (FPGA) 1002, a number of SpaceWire interfaces 1004, a SpaceWire ASIC 1006, primary and redundant S-Band transponder interfaces 1008, primary and redundant X and Ka Band transponder interfaces 1010, a Serializer/Deserializer (SERDES) interface 1012, discrete differential RS422/LVDS interfaces 1014, a Ground System Electronics (GSE) hardline interface 1016, and primary and redundant power monitor card interfaces 1018.

The communication card 100 may be connected to the processor card 200 via one or more SpaceWire interfaces 1004 and at least one of the RS-422/LVDS interfaces 1014. The communication card 100 provides housekeeping data received over the Spacewire interface from the processor card 200 to the S-Band transponder 24. The communication card 100 may accept a heartbeat signal from the processor card 200 as part of a system level fault detection and correction scheme via RS-422. The timing for the heartbeat signal may be mission specific programmable.

The communication card 100 may be connected to the power monitor card 400 via the primary and redundant RS-422 interfaces 1018. The communication card 100 may send power monitor card commands via the primary and redundant RS-422 interfaces 1018, including sending reset switchover commands.

The communication card 100 may be connected to the data storage card 600 via SpaceWire and a Serializer/Deserializer (SERDES) interface. The SERDES interface may include a transmitter and receiver pair that provides a high speed data link between the data storage card 600 and the communication card 100.

The communication card 100 may be connected to the communication subsystem 20 through the S-band 1008 and X-band 1010 transponder interfaces.

The on-board FPGA 1002 generally provides processing resources for implementing the functionality of the communication card 100. The FPGA may include a SpaceWire Router IP Core for controlling SpaceWire data flow, an S-Band IP Core for controlling data flow through the primary S-Band and Redundant S-Band transponder interfaces 1008 to an S-Band transponder 24 of the communication subsystem 20, and a High Speed IP Core for controlling dataflow through the primary X-Band and Redundant X-Band transponder interfaces 1010 to an X and Ka Band transponder 26 of the communication subsystem 20.

The SpaceWire Router IP Core provides SpaceWire protocol connectivity for the SpaceWire ports 104. The SpaceWire ports 104 are redundant to allow for a cross-strapping capability. Data formats across all SpaceWire links, except SpaceWire Router configuration packets, are in the Consultative Committee for Space Data Systems (CCSDS) format, which is encapsulated into SpaceWire packets for transfer over the SpaceWire links.

The SpaceWire Router IP Core further provides a timecode generation feature for generating timecodes for broadcast over the SpaceWire networks for synchronizing connected components. Using the SpaceWire timecode feature reduces the number of discrete components, front panel connectors, and harnessing that would be required to convey separate and discrete time synchronization signals. The communication card 100 SpaceWire Router IP Core initiates two SpaceWire Virtual Channel Data Unit (VCDU) handshaking timecodes. One VCDU handshaking timecode may be utilized for transmissions between the communication card 100 and the processor card 200 and another VCDU handshaking timecode may be used for transmissions between the communication card 100 and the data storage card 600.

The S-Band IP Core generally controls data flowing between the communication card 100 and the S-Band transponder 24. This includes stored and real-time housekeeping data from the processor card 200, command and status data from the S-Band transponder 24, uplink packets from the S-Band transponder 24, spacecraft hardware decoded commands, and the communication card 100 command and status registers. The S-Band IP Core also includes an interface with the SpaceWire Router IP Core.

The S-Band IP Core includes functions to encode downlink data into Quadrature Phase Shift Keying (QPSK), Staggered Quadrature Phase Shift Keying (SQPSK), or (BPSK) direct carrier modulation. Encoding may be disabled in order to increase data bandwidth. The S-Band IP Core may also implement a 7/8 low density parity checker as part of the data encoding scheme.

The communication card 100 generally functions as an interface between the processor card 200 and the communication subsystem 20 to support uplink and downlink functions over S-Band and high speed downlink functions over X-band and Ka-band, including simultaneous data transmission and reception. The communication subsystem 20 may include the above mentioned S-Band transponder 24 and X and Ka Band transponder 26. The communication card 100 may be connected to the communication subsystem 20 via an RS-422 S-Band transponder interface, parallel LVDS and RS-422 high speed transmitter downlink interfaces, and additional SERDES and RS-422 high speed transmitter downlink interfaces.

In addition, the communications card may include hardline interfaces 1016 to the S-Band transponder 24 and X and Ka Band transponder 26 for ground testing the S-Band transponder 24 and X and Ka Band transponder 26. In at least one embodiment, the hardline interfaces 1016 may include multiple RS-422 and LVDS hardline connections. Alternately, the hardline interfaces 1016 may include a SERDES transmitter and receiver pair.

The communications card interfaces 1008 to the S-Band transponder 24 may be RS-422, LVDS, or a combination of RS-422 and LVDS. The communication card 100 may write to and read from multiple S-Band Transponder command and status registers, and exchange the command and status register information with the processor card 200 over one or more of the SpaceWire interfaces 1004.

The communications card interface to the X and Ka Band transponder 26 may be a dual redundant parallel LVDS interface and a SERDES interface configured to accommodate high speed transmissions. The X and Ka Band transponder 26 may include multiple command and status registers that can be written to and read from by the communication card 100, and the X and Ka Band transponder 26 command and status register information may be exchanged with the processor card 200 over a SpaceWire interface.

The SpaceWire ASIC 1006 is provided to increase the SpaceWire link signaling rate. The SpaceWire ASIC 1006 implements a SpaceWire physical layer with timing that provides increased signaling rate and reduced FPGA resources.

Processor Card

As shown in FIG. 1, the processor card 200 is generally coupled to the communication card 100, the housekeeping card 300, the engine valve drive card 500 and the data storage card 600. The processor card 200 is designed to store and run flight software and generally control the operations of the satellite system 10 and the modular unified avionics system 80. While the processor card 200 is described as a single card, it should be understood that there may be redundant, cross strapped processor cards in the modular unified avionics system 80.

Figure 11:
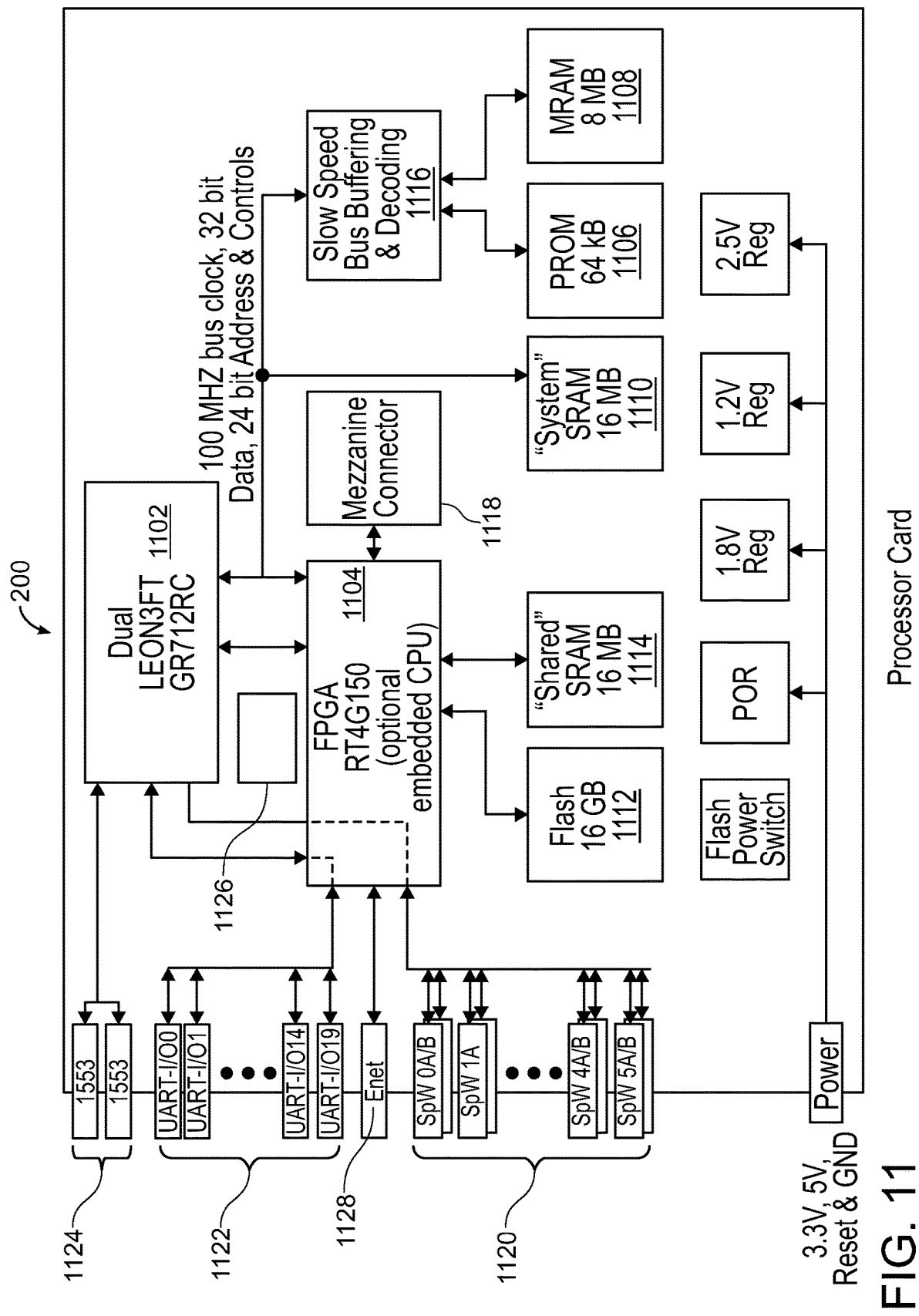
FIG. 11 depicts a block diagram of a processor card.

FIG. 11 depicts a block diagram of the processor card 200. The processor card 200 includes a main CPU 1102, an FPGA 1104, a PROM 1106, Magnetoresistive Random Access Memory (MRAM) 1108, system Static Random Access Memory (SRAM) 1110, flash memory 1112, and shared SRAM 1114. The processor card 200 also includes buffering and decoding circuitry 1116, a mezzanine connector 1118, and a number of SpaceWire interfaces 1120. In addition, the processor card 200 includes a number of differential discrete I/O and UART interfaces 1122 and a Mil-STD 1553 interface 1124. An oscillator 1126 provides clock signals for various components.

The main CPU 1102 may be a radiation hardened processor with a clock speed of approximately 100 Mhz. The main CPU 1102 controls the main data bus, provides software processing power for the system, and may include a number of UARTS.

The FPGA 1104 may also be radiation hardened and generally supports optional implementation of a number of CPU cores, control of the flash memory 1112, an interface to the mezzanine connector 1118, and control of the main CPU interface to the SRAM 1110, 1114. The FPGA 1104 may also include its own interface to the PROM 1106, MRAM 1108, SRAM 1110, 1114, and flash memory 1112. The FPGA 1104 provides routing of the SpaceWire ports to their various transceivers, a number of differential I/O signal pairs (LVDS or RS-422) shared with the main CPU UARTS, and an Ethernet interface 1128.

The PROM 1106 is used to store the processor card's boot code and may be a read-only, non-volatile, radiation hardened component. The PROM 1106 may be programmed before installation on the processor card 200 and in some embodiments may be implemented as two 32 KB components or any other suitable configuration that can be populated as needed.

The MRAM 1108 may be used to store application code for the processor card 200 and may provide non-volatile, long term data retention of approximately 20 years. The MRAM 1108 may be placed in a sleep or reset mode by a signal provided by the FPGA 1104 and may be write protected in software or through the FPGA 1104. The MRAM may be implemented as four 8 MB components or any other suitable configuration that can be populated as needed.

The system SRAM 1110 provides temporary volatile storage and running space for main application code of the main CPU 1102 and is connected to a memory bus of the main CPU 1102. The shared SRAM 1114 provides temporary volatile storage and running space for embedded CPUs of the FPGA 1104 and is only accessible through the FPGA 304. Data in the SRAM components 1110, 1114 is assumed to be invalid between power cycles and the data may be periodically scrubbed to prevent accumulation of bit errors. The SRAM 1110, 1114 may be implemented as 4 MB, 8 MB, or 16 MB components or any other suitable configuration that can be populated as needed.

The flash memory 1112 provides non-volatile storage accessible only through the FPGA 1104 and is capable of being power cycled to clear Single Event Functional Interrupt (SEFI) events. The flash memory 1112 may be implemented as sixteen 1 GB components or any other suitable configuration.

The processor card 200 may support any number of SpaceWire ports 1120, configured as individual or fully redundant ports. The main CPU 1102 may also support any number of SpaceWire ports 1120 that may utilize LVDS repeaters, where each repeater can support two SpaceWire ports, and the ports may be configured for redundancy. The SpaceWire ports 1120 may also utilize redundant transceivers and connectors through routing in the FPGA 1104 and additional SpaceWire ports may be implemented by the FPGA 1104 itself.

The differential discrete I/O and UART interfaces 1122 may utilize LVDS or RS422 transceivers and may be used as UARTs, SpaceWire, general purpose I/O, or may be used to perform other application specific functions. Signals to the differential discrete I/O and UART interfaces 1122 may originate from the main CPU 1102 or from the FPGA 1104.

As mentioned above, the processor card 200 may include an oscillator 1126. The processor board 200 may operate using a number of different clocking schemes. In some embodiments, the oscillator 1126 may be used alone to clock components on the processor card 200, or a second oscillator (not shown) may be used to separately clock the MIL-STD-1553 interface 1124. When using the oscillator 1126 alone, the oscillator 1126 provides a cock signal to the main CPU 1102, the FPGA 1104, and the mezzanine connector 1118. The FPGA 1104 in turn generates and provides the MIL-STD-1553 clock to the main CPU 1102. Clocks for the SpaceWire interfaces supported by the main CPU 1102 are generated by the main CPU 1102 and clocks for the SpaceWire interfaces supported by the FPGA 1104 are generated by the FPGA 1104.

In some embodiments, an auxiliary oscillator (not shown) may be installed to separately generate the MIL-STD-1553. In alternate embodiments, an external clock signal may be provided to the FPGA 1104, for example, through the mezzanine connector 318 which in turn may generate clock signals for the components on the processor card 200.

Housekeeping Card

Referring again to FIG. 1, the housekeeping card 300 is connected to the communication card 100, the processor card 200, and the engine valve drive card 500. The housekeeping card 300 is generally responsible for monitoring spacecraft and instrument housekeeping data, such as thermal telemetry, single ended or differential voltages, internal housekeeping telemetry, for example, temperatures and secondary voltages, from the communication card 100, processor card 200, power monitor card 400, engine valve drive card 500, data storage card 600, low voltage power controller card 700, output module card 800 and solar array control card 900. The housekeeping card 300 may also monitor external discrete switches and coarse sun sensor currents. While the housekeeping card 300 is described as a single card, it should be understood that there may be redundant, cross strapped housekeeping cards in the modular unified avionics system 80.

Figure 12:
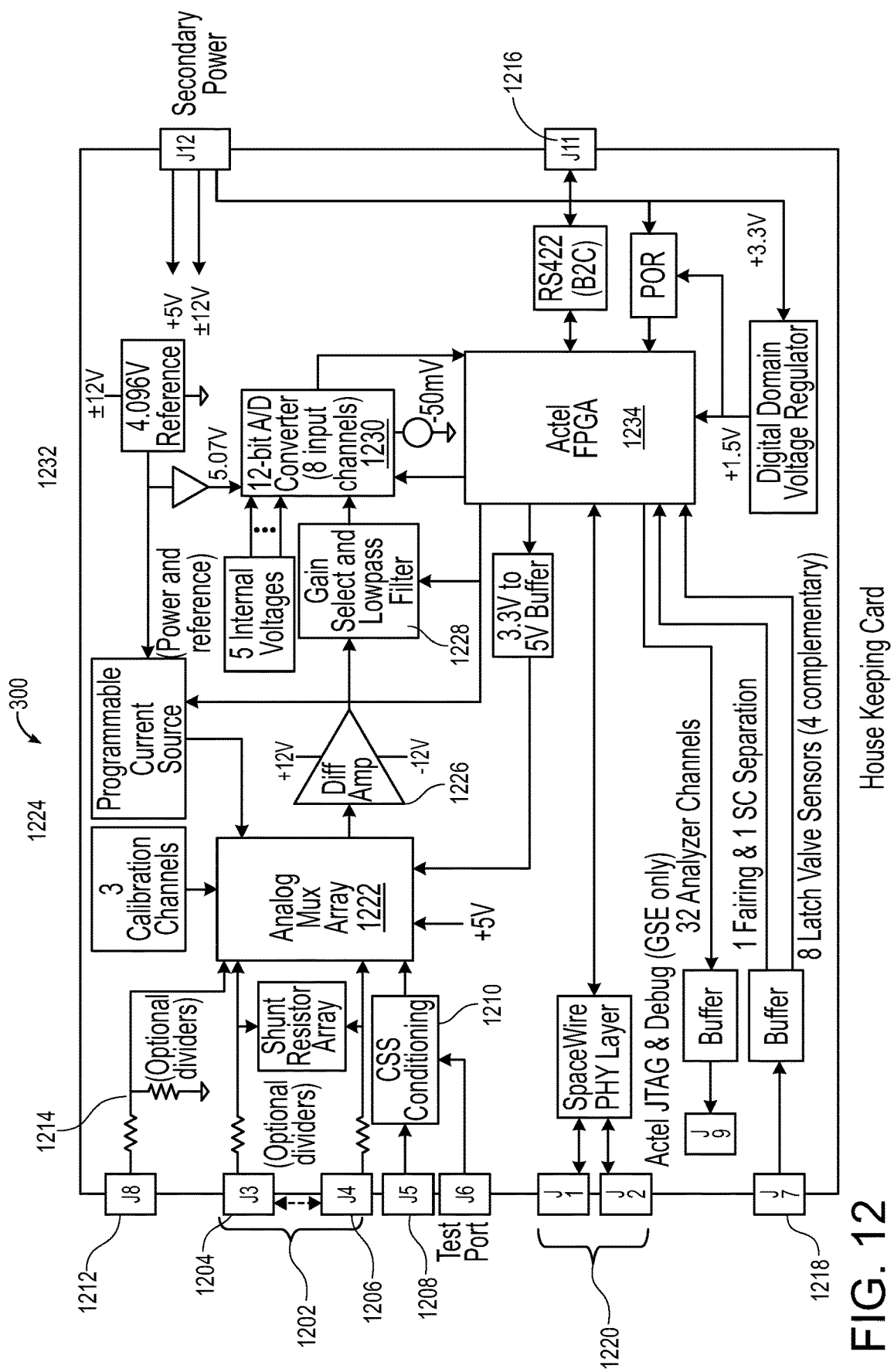
FIG. 12 depicts a block diagram of a housekeeping card.

FIG. 12 depicts a block diagram of the housekeeping card 300. The housekeeping card may include a number of analog and digital telemetry channels including single-ended channels 1202 distributed over two telemetry ports 1204, 1206.

The housekeeping card 300 may also include coarse sun sensor interfaces 1208 for reading signals from the solar array control card 900, and conditioning circuitry 1210 for adjusting to different sensor currents, and also may include channels 1212 for reading differential voltages, for example, from 0-5V with optional resistor dividers 1214 for signals up to 15V. The differential voltage channels 1212 may also include a differential analog channel for power system electronic analog data. An optional Board-to-Board Communication (B2C) interface 1216 for controlling power system electronics in systems without a power monitor card 400 may also be present on the housekeeping card 300.

The housekeeping card 300 may further include SpaceWire interfaces 1220 incorporating LVDS driver and receiver circuitry and an analog multiplexer array 1222 coupled to a programmable current source 1224 and an instrumentation amplifier 1226. The instrumentation amplifier 1226 may be connected in turn to a gain control and low pass filter circuit 1228 coupled to an A/D converter 1230. A precision reference voltage source 1232 provides a reference voltage to the prorammable current source 1224 and the A/D converter 1230. An FPGA 1234 operates as the central controller for the housekeeping card 300.

The single ended channels 1202 may be equipped to sense single-ended voltages, may provide a 0-3.2 mA current source for passive sensors, may include channels for 2.252 k to 10 k ohm thermistors, channels for 100-2K ohm platinum resistive thermometers, at least one channel of an internal housekeeping board 2.252 k to 10 k ohm thermistor channel, and calibration channels for temperature, aging, and radiation caused drift, The B2C interface 1216 may be used to control off card multiplexers, and the housekeeping card 300 may further include external digital discrete signal monitoring channels 1218 for monitoring discrete signals from break wires, latch valve states, etc.

The analog multiplexer array 1222 may be include 6 independent 16-channel circuits that provide telemetry for all the analog channels and may be coupled to a programmable current source 1226. The analog multiplexer array 1222 may be configured to provide resistance measurements when the current source 1226 is activated.

The A/D converter 1224 may be a low power, eight channel, 12-bit A/D with an input range set to approximately 5.12V. The A/D resolution may be approximately 1.25 mV/count. Acquisition may be accomplished by successive approximation with an internal track-and-hold circuit. The A/D may be clocked at 10 MHz and multiple samples, may be averaged to provide a single read value in telemetry.

A housekeeping FPGA 1228 operates as the central controller of the housekeeping card 300 and may be configured to operate as a housekeeping card reset controller, an analog Data Acquisition System (DAS) timing controller for all analog measurements, a digital DAS Timing Controller for all discrete digital input and output signals, a SpaceWire interface controller, and a B2C interface controller Power Monitor Card As shown in FIG. 1, the power monitor card 400 includes connections to the low voltage power controller card 700, the output module card 800, and the solar array control card 900. The power monitor card 400 also includes a SpaceWire interface to the processor card 200. While the power monitor card 400 is described as a single card, it should be understood that there may be redundant, cross strapped power monitor cards in the modular unified avionics system 80.

Figure 13:
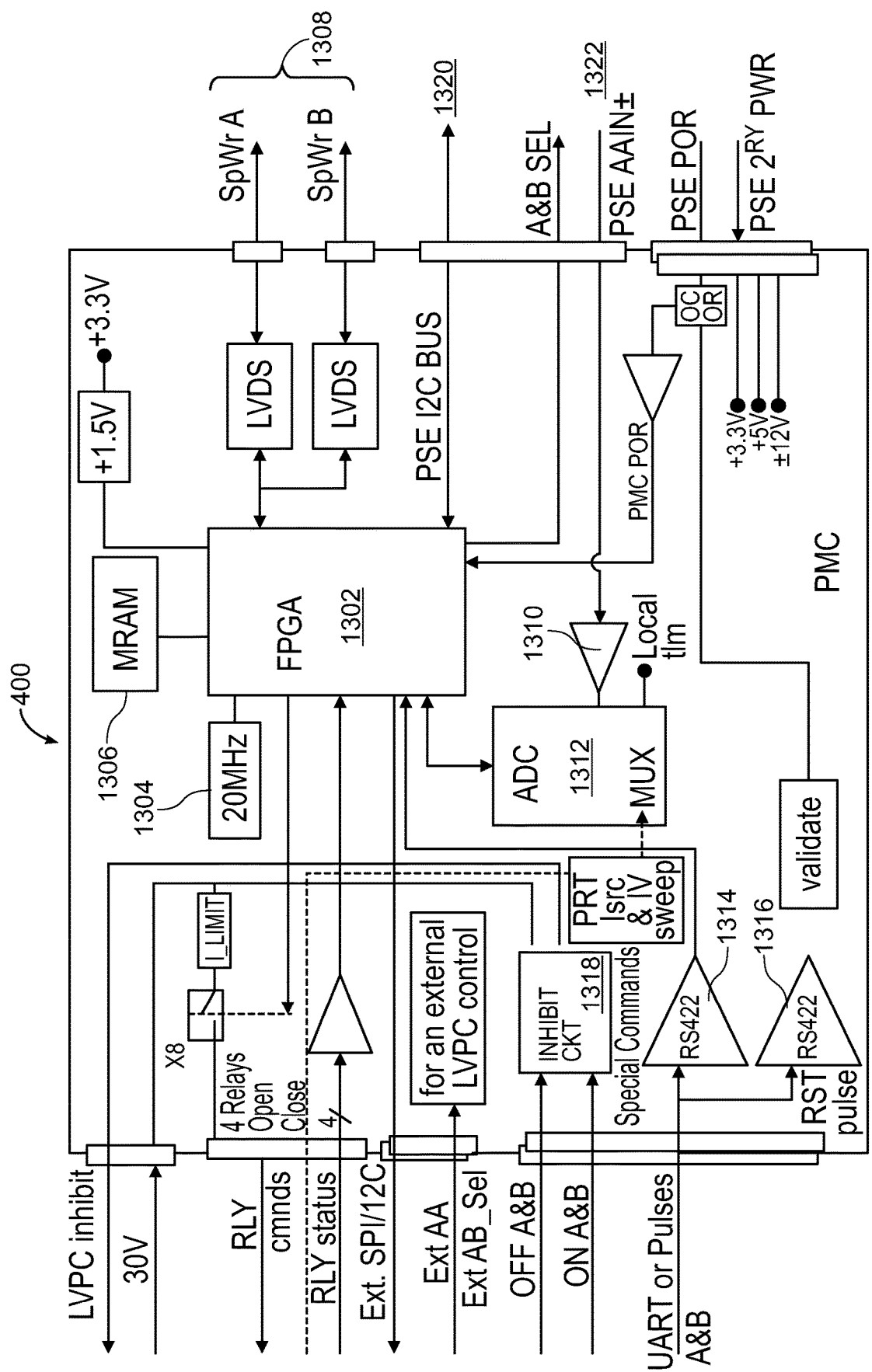
FIG. 13 depicts a block diagram of a power monitor card.

A block diagram of the power monitor card 400 is illustrated in FIG. 13. The power monitor card 400 includes a power monitor FPGA 1302, a power monitor clock 1304, an on-board magnetoresistive random access memory (MRAM) 1306, dual SpaceWire interfaces 1308, an amplifier 1310 coupled to an A/D converter 1312, a pair of RS422 interfaces 1314, 1316, a low voltage power controller card inhibit circuit 1318, and a dual I2C bus interface 1320.

The power monitor card 400 is designed as a state machine controller based on the FPGA 1302 and generally supports the operations of the low voltage power controller card 700, the output module card 800, and the solar array control card 900, and is configured to control power converters and switches on the low voltage power controller card 700, read telemetry information from the low voltage power controller card 700, and provide recovery signals for cards requiring a reset to resume normal operations, under control of the power monitor FPGA 1302.

The FPGA 1302 controls SpaceWire communication by operating as SpaceWire nodes interface controller, provides UART communication, on board control of the A/D converter 1312, supports I2C communication capability by operating as a local and external I2C master interface controller, and provides an MRAM for storing initial states, configuration, and command data.

The power monitor card 400 performs autonomous operations keyed to an internal timing loop and provides periodic telemetry to the spacecraft per the SpaceWire interfaces. The power monitor card 400 also implements watchdog timers to provide recovery signals in the event of internal or external contingencies. The power monitor card 400 uses the I2C bus for internal communication for load management, telemetry acquisition and battery charge control and the dual I2C bus interface 1320 to control at least one low voltage power controller card 700. The SpaceWire interfaces 1308 are used to receive communications from the processor card 200 and the RS422 interfaces 1312, 1314 are used to receive communications from the communication card 100.

a power monitor clock 1304, an on-board magnetoresistive random access memory (MRAM) 1306, dual SpaceWire interfaces 1308, an amplifier 1310 coupled to an A/D converter 1312, a pair of RS422 interfaces 1314, 1316, a low voltage power controller card inhibit circuit 1318, and a dual I2C bus interface 1320.

The power monitor clock 1304 provides timing signals to the power monitor FPGA 1302, the on-board MRAM stores initial states, configuration, and command data, the amplifier 1310 is coupled to the A/D converter 1312 for converting the telemetry information, the low voltage power controller card inhibit circuit 1318 operates to control power converters and switches on the low voltage power controller card 700, and the dual I2C bus interface 1320 retrieves the telemetry information from the low voltage power controller card 700 and the output module card 800.

The power monitor card 400 utilizes the amplifier 1310 for telemetry conversion of any suitable number of active analog inputs 1322 and then multiplexes the amplifier output to A/D converter 1312. is designed Engine Valve Driver Card Referring again to FIG. 1, the engine valve driver card 500 is coupled to the communication card 100, processor card 200, housekeeping card 300, and low voltage power controller card 700. While the engine valve driver card 500 is described as a single card, it should be understood that there may be redundant, cross strapped engine valve driver cards in the modular unified avionics system 80.

Figure 14:
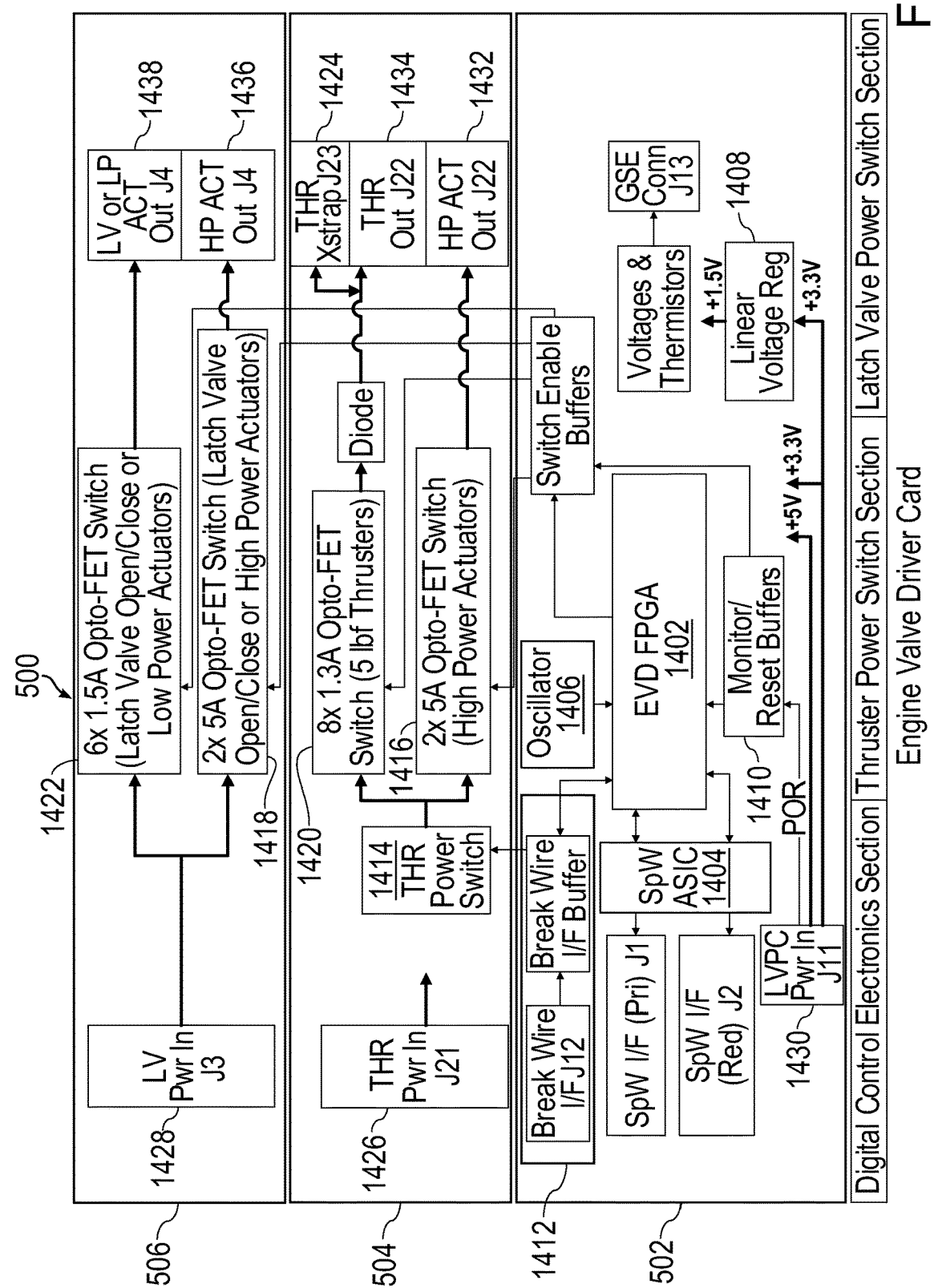
FIG. 14 shows a block diagram of an engine valve drive card.

FIG. 14 shows a block diagram of the engine valve drive card 500. The engine valve drive card 500 generally provides a digital control electronic section 502, a thruster power switch section 504, and a latch valve power switch section 506.

The digital control electronic section 502 includes an engine valve drive (EVD) FPGA 1402, a SpaceWire Physical Layer ASIC 1404, a crystal oscillator 1406, an on board linear voltage regulator 1408, a voltage monitor/reset generation circuit 1410, a breakwire separation monitor circuit 1412, and a power interface 1430 that provides power from the low voltage power controller card 700 to the digital control electronic section 502.

The thruster power switch section 504 includes a thruster power interface 1426 that provides thruster power from the output module card 800, a thruster power inhibit optocoupled FET switch 1414 controlled by the breakwire separation monitor circuit 1412 that provides power from the thruster power interface 1426 to optocoupled high-power thruster switches 1416, coupled in turn to a high power thruster interface 1432. The thruster power inhibit optocoupled FET switch 1414 also provides power from the thruster power interface 1426 to optocoupled low-power thruster switches 1420 coupled to a low power thruster interface 1434.

The latch valve power switch section 506 includes a latch valve power interface 1428 that provides latch valve power from the output module card 800 to optocoupled high-power latch valve switches 1418, coupled in turn to a high power latch actuator interface 1436. The latch valve power interface 1428 also provides latch valve power from the output module card 800 to optocoupled low-power latch valve switches 1422, coupled in turn to a low power latch actuator interface 1438.

The EVD FPGA 1402 is primarily responsible for controlling the spacecraft firing of thrusters and opening and closing of latch valves, based on commands received over the SpaceWire interface from the processor card 200. Engine valve driver card and FPGA telemetry are also sent upon request over the SpaceWire interface. The SpaceWire Physical Layer ASIC 1404 operates to control SpaceWire communications for the engine valve driver card 500. The crystal oscillator 1406 and on board linear voltage regulator 1408 provide a clock and power, respectively, for the FPGA 1402.

The optocoupled high-power thruster switches 1416 and optocoupled low-power thruster switches 1420 are configured to provide power to thrusters on the spacecraft from the output module card 800 under control of the FPGA 1402, upon commands from the processor card 200. The breakwire separation monitor circuit 1412 is coupled to the thruster power inhibit optocoupled FET switch 1414 and inhibits power to the optocoupled high-power thruster switches 1416 and optocoupled low-power thruster switches 1320 based on the breakwire condition.

The optocoupled high-power latch valve switches 1418 and optocoupled low-power latch valve switches 1422 are configured to provide power to latch valve actuators on the spacecraft from the output module card 800 under control of the FPGA 1402 based on commands from the processor card 200.

Data Storage Card

The data storage card 600 is connected to the communication card 100, processor card 200, and housekeeping card 300 as shown in FIG. 1. The data storage card is operable to provide science data storage within the modular unified avionics system 80, for example, experimental data collected by instruments. The data storage card 600 receives the data over SpaceWire or SERDES interfaces. While the data storage card 600 is described as a single card, it should be understood that there may be redundant, cross strapped data storage cards in the modular unified avionics system 80.

Figure 15:
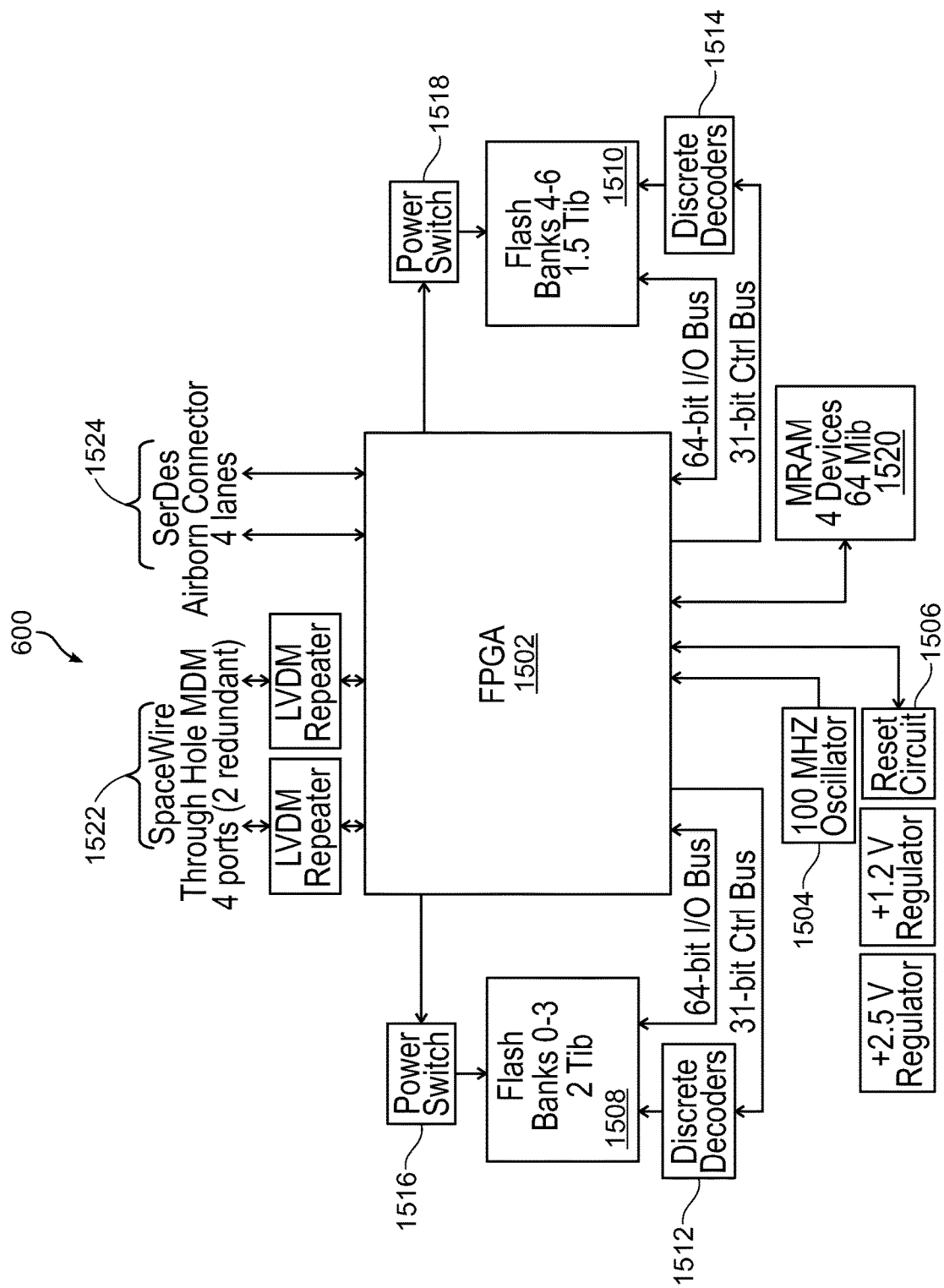
FIG. 15 depicts a block diagram of a data storage card.

A block diagram of the data storage card 600 is shown in FIG. 15. The data storage card 600 includes a data storage FPGA 1502, an FPGA clock 1504, an FPGA reset circuit 1506, banks of flash memory 1508, 1510, flash memory decoders 1512, 1514, flash memory power switches 1516, 1518, and a bank of MRAM 1520.

The data storage FPGA 1502 implements I/O and control busses of the flash memory banks 1508, 1510, and the MRAM bank 1520. The data storage FPGA 1502 also provides SpaceWire interfaces 1522 and SERDES interfaces 1524.

The FPGA clock 1504 may be a differential oscillator and may provide a SERDES reference clock, and optionally, an internal clock, for the data storage FPGA 1502. The FPGA reset circuit 1506 operates to monitor 3.3 and 1.2 volt supplies and hold the data storage FPGA 1502 in reset until those supplies are stable.

The flash memory banks 1508, 1510, are addressed by the data storage FPGA through the decoders 1512, 1514, respectively. Each flash memory bank 1508, 1510 has a power switch 1516, 1518 controlled by the data storage FPGA 1502 used to power cycle the flash memory banks 1508, 1510 to clear Single Event Functional Interruptions (SEFIs). The flash memory banks 1508, 1510 are non-volatile with a data retention period of at least 10 years, and may be organized as multiple components, populated on the data storage card 600 only as needed. For example, the data storage card may accommodate 4 flash memory components but may only require and be populated with 2 components.

The MRAM bank 1520 is non-volatile with a data retention period of at least 20 years, and may be organized as multiple components, populated on the data storage card 600 only as needed. For example, the data storage card may accommodate 4 MRAM components but may only require and be populated with 2 components.

Low Voltage Power Controller Card

The low voltage power controller card 700 is coupled to the housekeeping card 300, power monitor card 400, and the output module card 800, as shown in FIG. 1. The low voltage power controller card 700 converts spacecraft bus power to low voltages and distributes these voltages among other cards in the modular unified avionics system 80. The low voltage power controller card 700 also provides telemetry of onboard functions, communication interfaces, and power on reset circuitry. The low voltage power controller card 700 may be controlled from the housekeeping card 300 or the power monitor card 400 via an I2C or SPI Bus. While the low voltage power controller card 700 is described as a single card, it should be understood that there may be redundant, cross strapped low voltage power controller cards in the modular unified avionics system 80.

Figure 16:
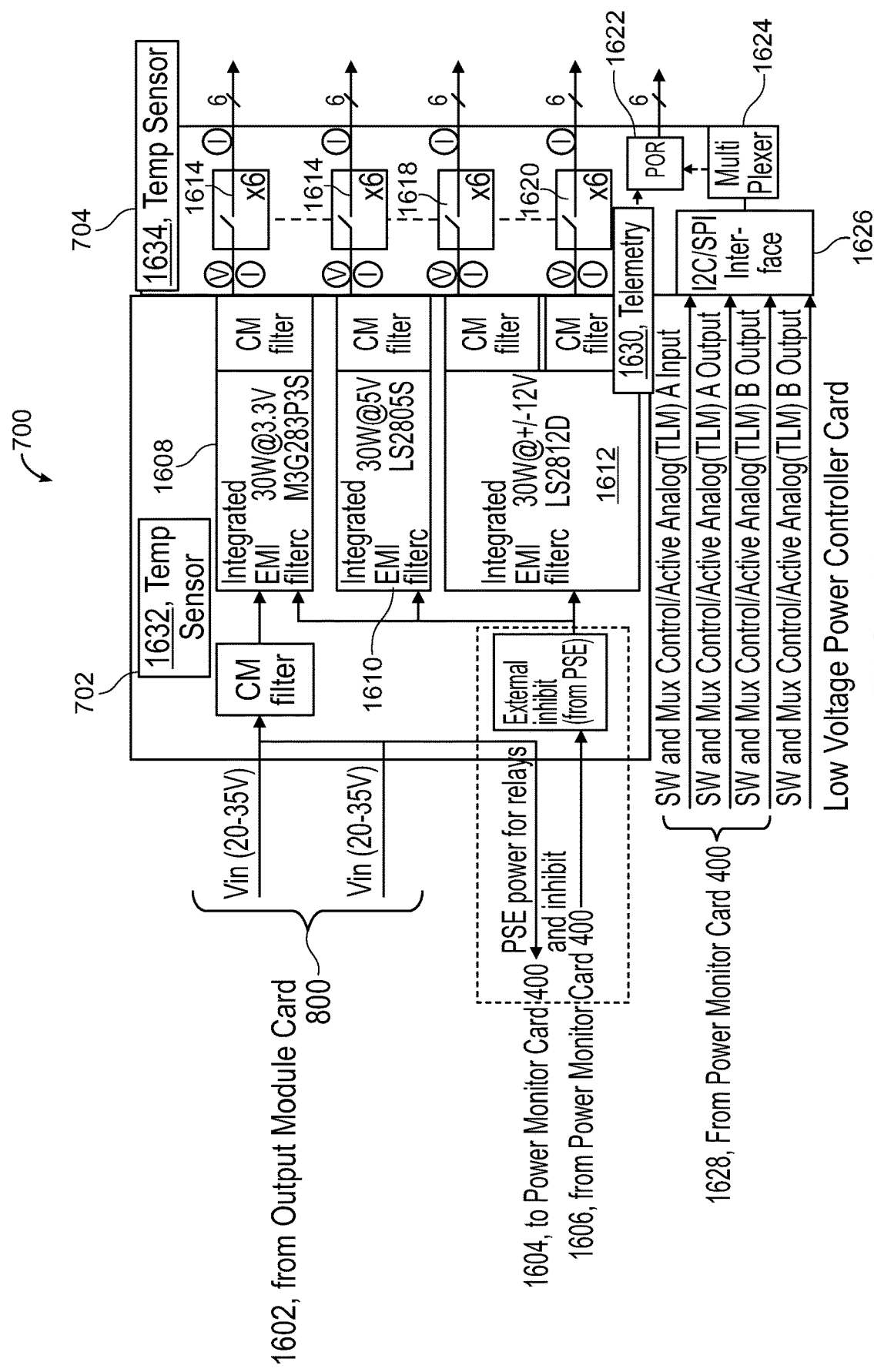
FIG. 16 depicts a block diagram of a low voltage power controller card.

FIG. 16 depicts a block diagram illustrating the components of the low voltage power controller card 700. The low voltage power controller card 700 includes a converter card 702 and a switch card 704 that mate together within a chassis. The switch card 704 includes switch banks for switching various power outputs and power on reset signals to other cards, I2C or SPI interfaces to other cards in the modular unified avionics system 80, an I2C/SPI multiplexer, and telemetry monitoring functions. The converter card 702 includes switching mode converters that may be coupled to power feeds from the output module card 800 and may convert the power feeds to regulated output supplies. Each regulated supply may be switched to multiple power supply lines to provide power to other cards in the modular unified avionics system 80 through the switch card 1604.

The converter card 702 may include an interface 1602 to the output module card power feeds and a power feed pass through 1604 to the power monitor card 400. The power monitor card 400 may also provide an inhibit signal 1606 to the converter card 702 to prevent operation of the switching mode converters. The output module card power feeds may have a voltage range of approximately 20-35 volts and are provided to a 30 W 3.3 v switching mode converter 1608, a 30 W 5.0 v switching mode converter 1610, and a 30 W+/−12.0 v switching mode converter 1612.

The 30 W 3.3 v switching mode converter 1608 may be configured to provide a minimum voltage of 3.28 volts and a maximum voltage of 3.32 volts, with a line regulation of +0.1 volts, and a load regulation of 0.5%.

The 30 W 5.0 v switching mode converter 1610 may be configured to provide a minimum voltage of 4.95 volts and a maximum voltage of 5.05 volts, with a line regulation of 0.5%, and a load regulation of 1%.

The 30 W+/−12.0 v switching mode converter 1612 may be configured to provide a +12 volt supply with a minimum voltage of 11.76 volts and a maximum voltage of 12.24 volts, with a line regulation of 0.5%, a load regulation of 1%, and a cross regulation with the −12 volt supply of 3%.

The 30 W+/−12.0 v switching mode converter 1612 may be configured to provide a −12 volt supply with a minimum voltage of −11.76 volts and a maximum voltage of −12.24 volts, with a line regulation of 0.5%, a load regulation of 1%, and a cross regulation with the +12 volt supply of 3%.

The outputs of the 30 W 3.3 v switching mode converter 1608 and the 30 W 5.0 v switching mode converter 1610 are provided to switch banks 1614 and 1616, respectively, on the switch card 704. The output of the 30 W+12.0 v switching mode converter is provided to switch bank 1618 and the output of the 30 W −12.0 v switching mode converter is provided to switch bank 1620. Each switch bank 1614, 1616, 1618, 1620 of the switch card 704 may provide multiple power feeds to other cards in the modular unified avionics system 80. In some embodiments, the switch banks 1614, 1616, 1618, 1620 may include 6 switches each.

The source impedance for the switches in switch bank 1614 may have a maximum resistance at 25° C. of 15 mOhms, the source impedance for the switches in switch bank 1616 may have a maximum resistance at 25° C. of 90 mOhms, the source impedance for the switches in switch bank 1618 may have a maximum resistance at 25° C. of 90 mOhms, and the source impedance for the switches in switch bank 1620 may have a maximum resistance at 25° C. of 40 mOhms.

The switch card 704 also includes a switch bank 1622 of 6 switches for providing power on reset signals to the switch banks 1614, 1616, 1618, 1620 and other cards in the avionics system 80.

The switches in the switch banks 1614, 1616, 1618, 1620, 1622 may be operated by signals from the power monitor card through an I2C/SPI multiplexer 1624 under control of an I2C/SPI interface 1626 with active analog lines 1628 for receiving signals from the power monitor card 400.

The converter card 702 includes a temperature sensor 1632 and the switch card 704 also includes a temperature sensor 1634.

The switch card 704 also includes telemetry point circuitry 1630 that routes various telemetry points to the I2C/SPI interface under control of commands received from the power monitor card 400. A command selects the telemetry point and an active analog line of the I2C interface 1626, and in response the telemetry point circuitry 1630 latches the telemetry point to the specified active analog line to be read by the power monitor card 400.

The telemetry points include the +5V switching mode converter output current measured on the return side of the switches in switch bank 1616, the +3.3V switching mode converter output current measured on the return side of the switches in switch bank 1614, the +12V switching mode converter output current measured on the output side of the switches in switch bank 1618, the return current of both the +12 and −12 volt switching mode converters 1612, and the input current of the spacecraft bus power feeds 1602.

The telemetry points also include the +5V switching mode converter output voltage measured before the switch bank 1616, the +3.3V switching mode converter output voltage measured before the switch bank 1614, the +12V switching mode converter output voltage measured before switch bank 1618, and the −12V switching mode converter output voltage measured before switch bank 1620.

Additional telemetry points include the output of temperature sensor 1632 on the converter card and the output of temperature sensor 1634 on the switch card 704.

Output Module Card

As shown in FIG. 1, the output module card 800 is connected to the housekeeping card 300, the power monitor card 400, and the low voltage power controller card 700. The output module card 800 is configured to provide multiple primary power switched services typically ranging from 22-35V and 1-15 A to satellite subsystems or other avionics system cards under control of the housekeeping card 300 or the power monitor card 400. The power switched services are over current protected and provide analog telemetry for current and output voltage status. The output module card 800 may also provide un-switched fused power services. While the output module card 800 is described as a single card, it should be understood that there may be redundant, cross strapped output module cards in the modular unified avionics system 80

Figure 17:
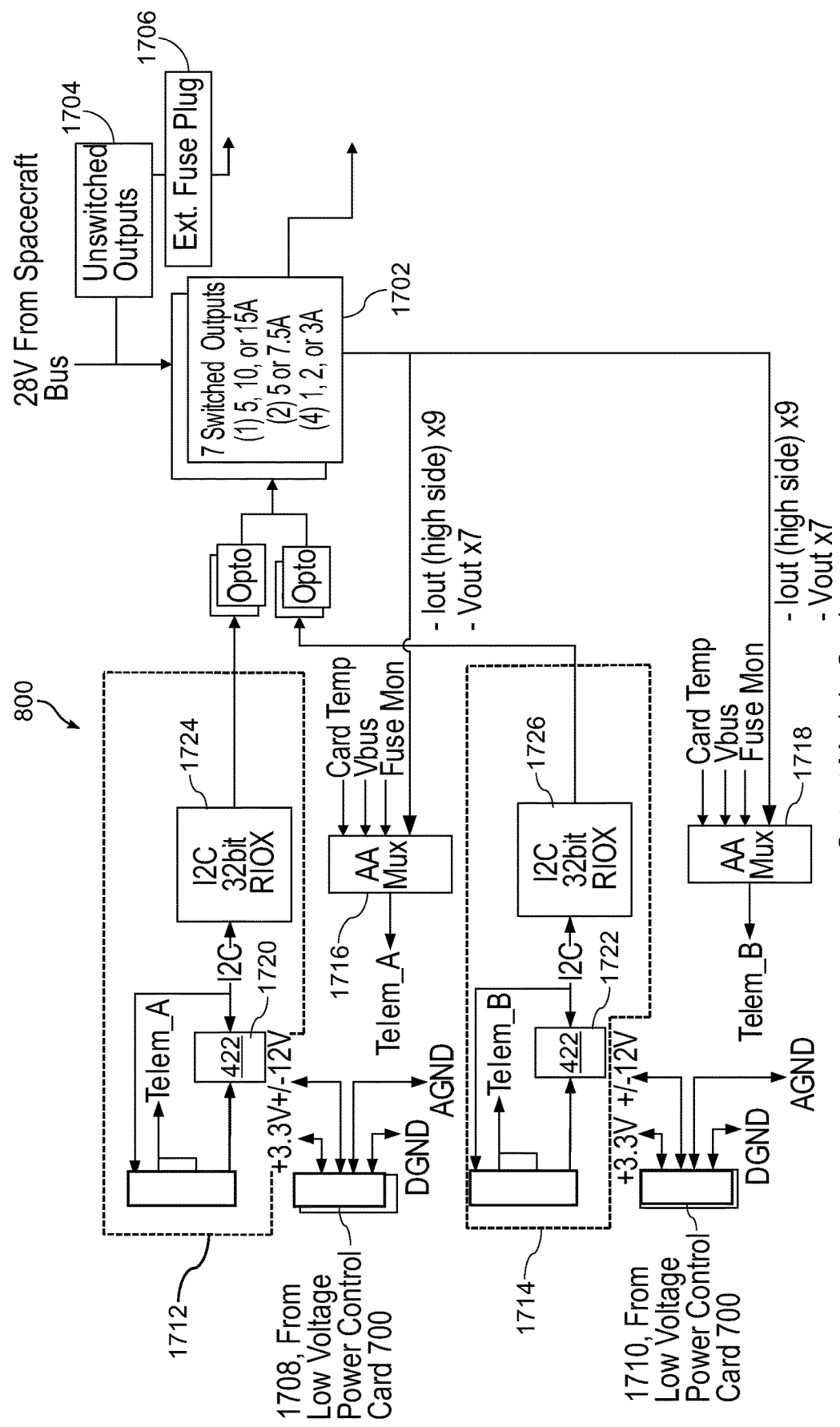
FIG. 17 shows a block diagram of an output module card.

The output module card 800 is shown in block diagram form in FIG. 17. The output module card 700 includes a plurality of switched services 1702, unswitched fused power services 1704, dual secondary power interfaces 1708, 1710, I2C interfaces 1712, 1714, active analog multiplexers 1716, 1718 for on board telemetry monitoring, and a 28 volt input 1728 from the spacecraft power bus.

The switched services 1702 may include one high current service at a maximum of 15 A, two medium current services at a maximum of 7.5 A, and four low current services at 3 A maximum.

Each of the switched services 1702 may be constructed of similar circuits with only changes to switching semiconductors and current sense resistors according to the rating of each switched service. Each switched service may include a separately controllable high side switch and a return side switch. Each high side switch may function as an electronic circuit breaker that trips for an over-current condition. The return side switch may not be affected by the over current trip. One or more of the return side switches may be eliminated and replaced with hard wired connections if not required.

Each switched service 1702 provides over-current protection in the form of a resettable circuit breaker set to trip at approximately 115% of rated current. Each switched service 1702 also provides a current limit and approximately 50 uS instant trip function for short circuits at approximately 750% of rated current. Each switched service 1702 includes trip filter circuitry, for example, an RC network to control the 115% trip time. The trip filter circuitry is configured to allow larger currents for shorter durations without tripping to accommodate inrush and load transients. The trip filter circuitry trip time may be dependent on the load current at the time the fault occurs. For example, in the event of a fault, if a switch is just turning on or near zero load the trip filter time constant may take a longer time to reach than if the switch is turning on at or near 100% load.

The unswitched fused power services 1704 may include a service at a maximum of 5 A and a service at a maximum of 2.5 A, which may be fused by an external loop-back fuse plug 1706.

The I2C interfaces 1712, 1714 include an RS-422 interface 1720, 1722 connected to a radiation hardened input/output expander with IC and SPI serial interfaces 1724, 1726. The I2C interfaces 1712, 1714 provide the housekeeping card 300 or power monitor card 400 with the capability to command the switched services 1702 as well as select mux channels of the input/output expanders 1724, 1726 for the analog telemetry provided to the housekeeping card 300 or power monitor card 400. The telemetry points include temperatures at 2 locations on the output module card 800, a current for each current service of the switched services 1702, current provided by the unswitched fused power services 1704, a voltage provided by each current service of the switched services 1702, voltages provided at the dual secondary power interfaces 1708, 1710, the spacecraft bus voltage 1728, and the voltage on the output side of the external loop-back fuse plug 1706.

The quiescent output module card power consumption (with all switches OFF) is in the range of <0.5 W. The power consumption with all switches ON and zero load is in the range of <1.6 W.

Solar Array Control Card

Referring again to FIG. 1, the solar array control card 900 is connected to the power monitor card 400, the low voltage power controller card 700, and the output module 800 card. The solar array control card 900 is a solar array power-processing card used in the spacecraft power system electronics comprising the power monitor card 400, the low voltage power controller card 700, and the output module card 800. While the solar array control card 900 is described as a single card, it should be understood that there may be redundant, cross strapped solar array control cards in the modular unified avionics system 80.

The solar array control card 900 includes two pulse width modulated (PWM) boost converters to support charging a battery in the power subsystem 50 while managing up to 500 W power from solar arrays in the power subsystem 50 into the unregulated spacecraft bus. The solar array control card 900 is generally controlled through an I2C interface. Four solar array segments of up to 4 A each may determine the input power into the solar array control card 900, with two segments per PWM converter for a total of 16 A of power. The battery charge current and voltage regulation fine control is managed by the PWMs. When the PWMs rail either on or off, a control loop on the power monitor card 400 may add or subtract a solar array segment providing a coarse control and incrementally increasing or decreasing the power from the solar array to the spacecraft bus and the battery on the power subsystem 50. There is an independent over-voltage circuit, which will remove (or shunt) the solar array segments if the bus voltage exceeds the over-voltage set voltage. The solar array control card 900 also provides analog telemetry to indicate output switch states as well as a measured current from each service.

Figure 18:
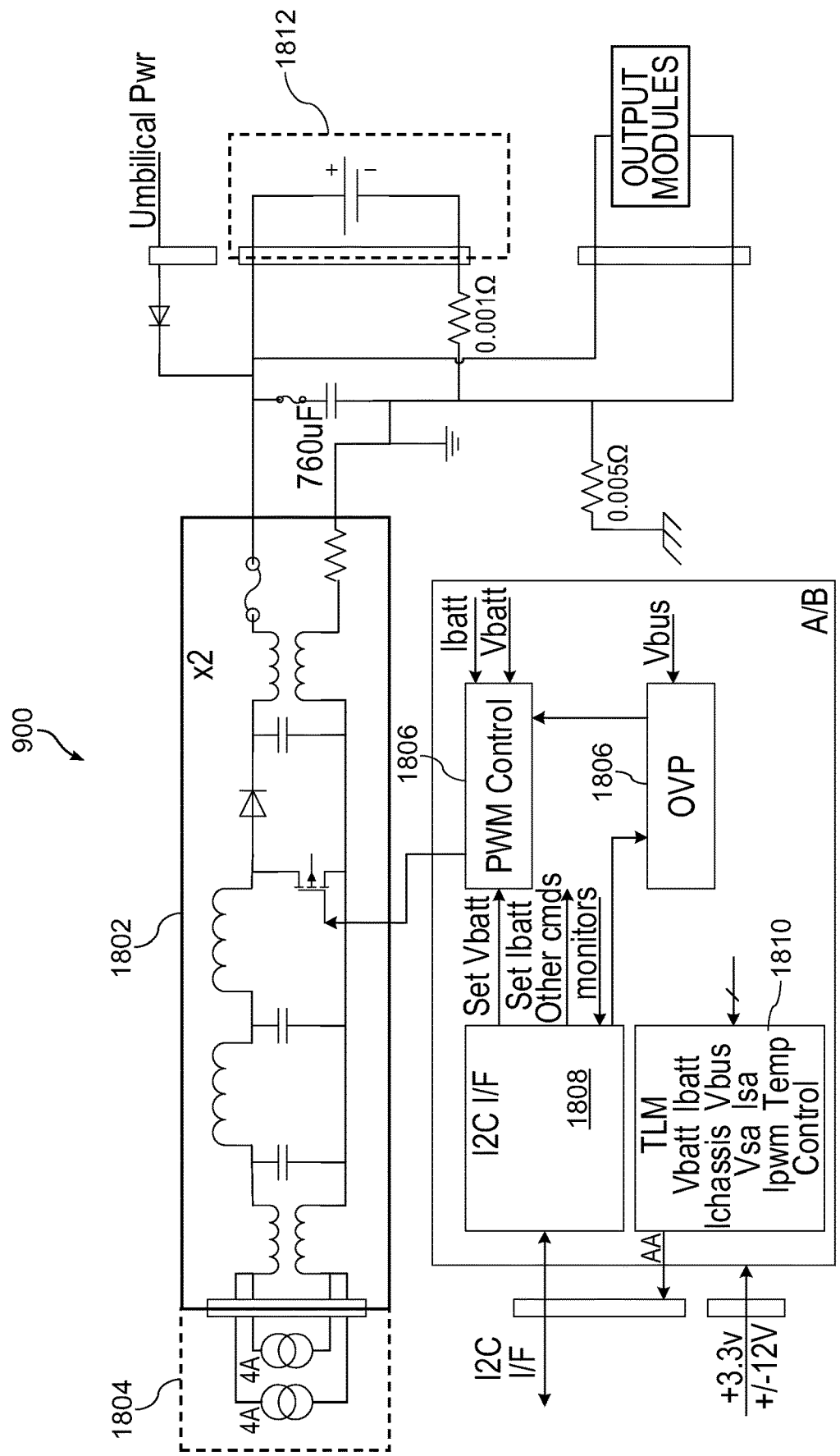
FIG. 18 depicts a block diagram of a solar array control card.

A block diagram of the solar array control card is shown in FIG. 18. The solar array control card 900 includes conversion circuitry 1802 coupled to solar array segments 1084 of the power subsystem 50, a pulse width modulation control circuit 1806, an over voltage protection circuit 1806, an I2C interface 1808, telemetry circuitry 1810, and an interface to batteries 1812 of the power subsystem 50.

All commands are exchanged with the solar array control card 900 and the power monitor card 400 through the I2C interface. Analog telemetry is selected by I2C commands to an on card multiplexer and passed to other cards for analysis. The solar array control card 900 card has a dual power interface allowing it to be powered by two separate independent low voltage power inputs from the low voltage power controller card 700. The solar array control card 900 receives power from the spacecraft solar array and provides power to the a primary power bus on each output module card 800.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:

1. An avionics system comprising:
   a plurality of card assemblies having a standard height and width, and a depth dependent on dimensions of components mounted on individual ones of the plurality of card assemblies; and
   a subset of the plurality of card assemblies selected according to their functionality and assembled together along their depth dimensions to form one or more modules having the standard height and width, for providing selected avionics functions for a spacecraft;
   wherein the communication card is configured to provide housekeeping data received from the processor card to an S-Band transponder of a communications subsystem coupled to the communication card, utilizing a first field programmable gate array;
   wherein the first field programmable gate array comprises:
      a Space Wire Router IP Core configured to control Space Wire data flow among the plurality of card assemblies;
      an S-Band IP Core for controlling data flow to the S-Band transponder; and
      a High Speed IP Core for controlling dataflow to an X and Ka Band transponder of the communication subsystem coupled to the communication card.

2. The avionics system of claim 1,
   wherein the one or more modules are distributable among available volumes within the spacecraft.

3. The avionics system of claim 1,
   wherein the one or more modules are distributable to meet one or more power, weight, volume, data transfer, or thermal requirements.

4. The avionics system of claim 1, wherein the one or more modules comprise endcaps attached to each end of a depth dimension of the one or more modules.

5. The avionics system of claim 1, further comprising a lid assembly attached to an end of at least one of the modules and extending along a width and depth of the module.

6. The avionics system of claim 5, wherein the lid assembly comprises an enclosure extending around a perimeter of the at least one module and a lid attached to the enclosure.

7. The avionics system of claim 1, wherein each card assembly comprises a card mounted in a chassis.

8. The avionics system of claim 7, wherein the chassis comprises a mechanism for fastening the chassis to an adjacent chassis.

9. The avionics system of claim 7, wherein the chassis comprises a heatsink configured to conduct heat from the card assembly through a base of the chassis.

10. The avionics system of claim 7, wherein the chassis comprises bracing to accommodate structural loads of the card.

11. The avionics system of claim 7, wherein the chassis comprises a lip extending around a perimeter of a first end and a groove extending around a perimeter of a second end, wherein when two or more chassis are mated together the lip of a first chassis extends into a groove of a second chassis and provides enhanced EMI shielding.

12. The avionics system of claim 1, wherein the processor card is configured to store and run flight software and control operations of the avionics system utilizing a main CPU and a second field programmable gate array.

13. The avionics system of claim 12, wherein:
the main CPU is configured to control a data bus among the plurality of card assemblies and process application code for the avionics system; and
the second field programmable gate array is configured to:
provide an additional CPU for the processor card;
route Space Wire ports on the processor card;
control memory devices on the processor card; and
implement an Ethernet port on the processor card.

14. The avionics system of claim 12, wherein the processor card further comprises:
a programmable read only memory storing boot code for the processor card;
a magnetoresistive random access memory storing application code for the processor card;
a static random access memory providing temporary volatile storage and running space for the application code; and
a flash memory providing non-volatile storage and configured to be power cycled to clear single event functional interrupt events.

15. The avionics system of claim 1, wherein the power monitor card is configured to control power converters and switches on the low voltage power controller card, read telemetry information from the low voltage power controller card and the output module card, and provide recovery signals for cards requiring a reset to resume normal operations, under control of a power monitor field programmable gate array.

16. The avionics system of claim 15, wherein the power monitor card comprises:
a power monitor clock for providing timing signals to the power monitor field programmable gate array;
on-board magnetoresistive random access memory for storing initial states, configuration, and command data;
an amplifier coupled to an A/D converter for converting the telemetry information;
a low voltage power controller card inhibit circuit for controlling the power converters and switches on the low voltage power controller card, and
dual I2C bus interfaces for retrieving the telemetry information from the low voltage power controller card and the output module card.

17. The avionics system of claim 1, wherein the housekeeping card is configured to monitor thermal telemetry and single ended and differential voltages from the communication card, processor card, power monitor card, engine valve drive card, data storage card, low voltage power controller card, output module card, and solar array control card, under control of a housekeeping field programmable gate array.

* * * * *